US010885710B2

(12) United States Patent
Holz et al.

(10) Patent No.: US 10,885,710 B2
(45) Date of Patent: Jan. 5, 2021

(54) REALITY-GUIDED ROAMING IN VIRTUAL REALITY

(71) Applicant: MICROSOFT TECHNOLOGY LICENSING, LLC, Redmond, WA (US)

(72) Inventors: Christian Holz, Seattle, WA (US); Eyal Ofek, Redmond, WA (US); Andrew D. Wilson, Seattle, WA (US); Lung-Pan Cheng, Taipei (TW); Junrui Yang, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/353,912

(22) Filed: Mar. 14, 2019

(65) Prior Publication Data

US 2020/0294311 A1   Sep. 17, 2020

(51) Int. Cl.
  *G06T 19/00*   (2011.01)
  *G06T 19/20*   (2011.01)
  (Continued)

(52) U.S. Cl.
  CPC .......... *G06T 19/003* (2013.01); *G02B 27/017* (2013.01); *G06F 3/011* (2013.01); *G06T 19/20* (2013.01); *H04N 13/271* (2018.05)

(58) Field of Classification Search
  CPC .................. G06T 19/003; G05T 19/20; G05T 2219/2021; G06F 3/011; G02B 27/017; H04N 13/271
  See application file for complete search history.

(56) References Cited

U.S. PATENT DOCUMENTS 9,865,089 B2   1/2018  Burns et al.
10,099,122 B2  10/2018  Black
(Continued)

FOREIGN PATENT DOCUMENTS

WO   2017139871 A1   8/2017
WO   2017180990 A1   10/2017

OTHER PUBLICATIONS

Sun, et al., "Towards Virtual Reality Infinite Walking: Dynamic Saccadic Redirection", In Journal of ACM Transactions on Graphics, vol. 37, Issue 4, Aug. 12, 2018, 13 Pages.
(Continued)

*Primary Examiner* — Haixia Du
(74) *Attorney, Agent, or Firm* — Shook, Hardy & Bacon L.L.P.

(57) ABSTRACT

In various embodiments, computerized methods and systems for dynamically updating a fully-immersive virtual environment based on tracked physical environment data. A computing device coupled to a HMD receives sensor data from a variety of sensors. The computing device can generate a virtual scene based on the received sensor data, whereby the virtual scene includes at least a portion of a virtual path that corresponds to at least a portion of a navigable path determined based on the received sensor data. The computing device can modify the virtual scene include a virtual obstruction that corresponds to a physical object detected based on additional sensor data received from the sensors. The modified virtual scene is presented to the user for display, so that the user can safely traverse the physical environment while staying fully-immersed in the virtual environment.

20 Claims, 15 Drawing Sheets

(51) Int. Cl.
*H04N 13/271* (2018.01)
*G06F 3/01* (2006.01)
*G02B 27/01* (2006.01)

(56) References Cited

U.S. PATENT DOCUMENTS

| | | | |
|---|---|---|---|
| 2015/0097719 A1* | 4/2015 | Balachandreswaran | A63F 13/5255 342/147 |
| 2016/0124502 A1 | 5/2016 | Sawyer et al. | |
| 2016/0217616 A1 | 7/2016 | Kraver et al. | |
| 2017/0192232 A1 | 7/2017 | Katz et al. | |
| 2017/0270711 A1* | 9/2017 | Schoenberg | G06T 7/20 |
| 2017/0372499 A1 | 12/2017 | Lalonde | |
| 2018/0093186 A1 | 4/2018 | Black et al. | |
| 2018/0190022 A1* | 7/2018 | Zamir | G06F 3/011 |
| 2019/0035124 A1* | 1/2019 | Kapinos | G06T 11/60 |
| 2019/0041651 A1 | 2/2019 | Kiemele et al. | |

OTHER PUBLICATIONS

Taguch, et al., "TransCAIP: A Live 3D TV System Using a Camera Array and an Integral Photography Display with Interactive Control of Viewing Parameters", In Journal of IEEE Transactions on Visualization and Computer Graphics, vol. 15, Issue 5, Sep. 2009, pp. 841-852.

Teichmann, et al., "MultiNet: Real-Time Joint Semantic Reasoning for Autonomous Driving", In Journal of Computing Research Repository, Dec. 2016, pp. 1-10.

Usoh, et al., "Walking > Walking-in-Place > Flying, In Virtual Environments", In Proceedings of the 26th annual conference on Computer graphics and interactive techniques, Jul. 1, 1999, pp. 359-364.

Vasylevska, et al., "Flexible Spaces: Dynamic layout Generation for Infinite Walking in Virtual Environments", In Journal of IEEE Symposium on 3D User Interfaces, Mar. 16, 2013, pp. 39-42.

Waller, et al., "The HIVE: A Huge Immersive Virtual Environment for Research in Spatial Cognition", In Journal of Behavior Research, vol. 39, Issue 4, Nov. 2007, 11 Pages.

Wichman, Glenn R., "A Brief History of Rogue", Retrieved From http://www.digital-eel.com/deep/A_Brief_History_of_Rogue.htm, Mar. 25, 2016, 2 Pages.

Wilson, et al., "Combining Multiple Depth Cameras and Projectors for Interactions on, above and between Surfaces", In Proceedings of the 23rd Annual ACM Symposium on User Interface Software and Technology, UIST '10, Oct. 3, 2010, 10 Pages.

Witmer et al., "Measuring Presence in Virtual Environments: A Presence Questionnaire", In Journal of Presence Teleoperators and virtual environments, vol. 7, No. 3,, Jun. 1998, pp. 225-240.

Zhu et al., "A Simple Outdoor Environment Obstacle Detection Method Based on Information Fusion of Depth and Infrared", In Journal of Robotics, vol. 2016, Dec. 2016, 11 Pages.

Newcombe, et al., "KinectFusion: Real-Time Dense Surface Mapping and Tracking", In Journal of IEEE International Symposium on Mixed and Augmented Reality, Oct. 2011, 10 Pages.

Molyneaux, et al., "Interactive Environment-Aware Handheld Projectors for Pervasive Computing Spaces", Lecture Notes in Computer Science, vol. 7319, 2012, 18 Pages.

"ARCore", Retrieved From https://developers.google.com/ad, Retrieved on: Oct. 23, 2018, 2 Pages.

"Bigscreen", Retrieved From https://bigscreenvr.com/, Retrieved on: Oct. 23, 2018, 4 Pages.

"Develop for Mixed Reality", Retrieved From https://developer.microsoft.com/en-us/mixed-reality, Retrieved on: Oct. 23, 2018, 4 Pages.

"Fallout 4 VR Now Available", Retrieved From https://bethesda.net/en/article/53ztTpcdK8CKSmG8migYsU/fallout-4-vr-launch-details, Dec. 12, 2017, 9 Pages.

"Google VR", Retrieved From https://vr.google.com/, Retrieved on: Oct. 23, 2018, 5 Pages.

"Imagine, Build and Succeed with Unity", Retrieved From https://unity3d.com/, Retrieved on: Oct. 23, 2018, 10 Pages.

"Intel Real Sense", Retrieved From https://realsense.intel.com/, Retrieved on: Oct. 23, 2018, 5 Pages.

"Oculus Go", Retrieved From https://www.oculus.com/go/, Retrieved on: Oct. 23, 2018, 8 Pages.

"Oculus VR", Retrieved From https://www.oculus.com/, Retrieved on: Oct. 23, 2018, 5 Pages.

"Pokemon Go", Retrieved From https://www.pokemon.com/us/pokemon-video-games/pokemon-go/, Sep. 11, 2015, 11 Pages.

"Rec Room", Retrieved From https://www.againstgrav.com/rec-room/, Retrieved on: Oct. 23, 2018, 3 Pages.

"Structure", Retrieved From https://structure.io/developers#bridge, Retrieved on: Oct. 23, 2018, 9 Pages.

"The Void", Retrieved From https://www.thevoid.com/, Retrieved on: Oct. 23, 2018, 6 Pages.

"Vive", Retrieved From https://www.vive.com/in/, Retrieved on: Oct. 23, 2018, 3 Pages.

"VIVE Developer", Retrieved From https://developer.vive.com/in/, Mar. 30, 2018, 2 Pages.

Beier, et al., "Feature-Based Image Metamorphosis", In Proceedings of the 19th annual conference on Computer graphics and interactive techniques, vol. 26, Issue 2, Jul. 1, 1992, pp. 35-42.

Brock, "FlyMap: Interacting with Maps Projected from a Drone", In Proceedings of the 7th ACM International Symposium on Pervasive Displays, Jun. 6, 2018, 10 Pages.

Byczkowski, et al., "A Stereo-Based System with Inertial Navigation for Outdoor 3D Scanning", In Proceedings of Canadian Conference on Computer and Robot Vision, May 25, 2009, pp. 221-228.

Chen, et al., "Real-Time Edge-Aware Image Processing with the Bilateral Grid", In Journal of ACM Transactions on Graphics, vol. 26, No. 3, Jul. 2007, 10 Pages.

Chen, et al., "Redirected Walking in Irregularly Shaped Physical Environments with Dynamic Obstacles", In Proceedings of IEEE Conference on Virtual Reality and 3D User Interfaces, Mar. 18, 2018, pp. 523-524.

Chen, et al., "Supporting Free Walking in a large Virtual Environment: Imperceptible redirected Walking with an Immersive Distractor", In Proceedings of the Computer Graphics International Conference, Jun. 27, 2017, 6 Pages.

Cheng, et al., "Sparse Haptic Proxy: Touch Feedback in Virtual Environments Using a General Passive Prop", In Proceedings of the CHI Conference on Human Factors in Computing Systems, May 6, 2017, 11 Pages.

Cheok, David Adrian, "Human Pacman: A Mobile Augmented Reality Entertainment System Based on Physical, Social, and Ubiquitous Computing", In Publication of Springer, Aug. 3, 2010, pp. 19-57.

Cheok, et al., "Human Pacman: a Sensing-Based Mobile Entertainment System with Ubiquitous Computing and Tangible Interaction", In Proceedings of the 2nd Workshop on Network and System Support for Games, May 22, 2003, pp. 209-224.

Cheok, et al., "Human Pacman: A Wide Area Socio-Physi-cal Interactive Entertainment System in Mixed Reality", In Proceedings of the CHI Conference on Human Factors in Computing Systems, Apr. 24, 2004, pp. 779-780.

Gai, et al., "Supporting Easy Physical-to-Virtual Creation of Mobile VR Maze Games: A New Genre", In Proceedings of the CHI Conference on Human Factors in Computing Systems, May 6, 2017, pp. 5016-5028.

Gal, et al., "FLARE: Fast Layout for Augmented Reality Applications", In Proceedings of IEEE International Symposium on Mixed and Augmented Reality, Sep. 10, 2014, 6 Pages.

Hettiarachchi, et al., "Annexing Reality: Enabling Opportunistic Use of Everyday Objects as Tangible Proxies in Augmented Reality", In Proceedings of the CHI Conference on Human Factors in Computing Systems, May 7, 2016, pp. 1957-1967.

Hirt, et al., "Preliminary Environment Mapping for Redirected Walking", In Proceedings of IEEE Conference on Virtual Reality and 3D User Interfaces, Mar. 18, 2018, 2 Pages.

(56) References Cited

OTHER PUBLICATIONS

Hirt, et al., "Real-Time Wall Outline Extraction for Redirected Walking", In Proceedings of the 23rd ACM Symposium on Virtual Reality Software and Technology, Nov. 8, 2017, 2 Pages.
Izadi, et al., "KinectFusion: Real-Time 3D Reconstruction and Interaction using a Moving Depth Camera", In Proceedings of the 24th Annual ACM Symposium on User Interface Software and Technology, Oct. 16, 2011, pp. 559-568.
Langbehn, et al., "In the Blink of an Eye: Leveraging Blink-Induced Suppression for Imperceptible Position and Orientation Redirection in Virtual Reality", In Journal of ACM Transactions on Graphics, vol. 37, Issue 4, Aug. 2018, Aug. 2018, 11 Pages.
Lindlbauer, et al., "Remixed Reality: Manipulating Space and Time in Augmented Reality", In Proceedings of the CHI Conference on Human Factors in Computing Systems, Apr. 21, 2018, 13 Pages.
Marwecki, et al., "VirtualSpace—Overloading Physical Space with Multiple Virtual Reality Users", In Proceedings of the CHI Conference on Human Factors in Computing Systems, Apr. 21, 2018, 10 Pages.
Peasley, et al., "Replacing Projective Data Association with Lucas-Kanade for KinectFusion", In Proceedings of IEEE International Conference on Robotics and Automation, May 6, 2013, pp. 638-645.
Razzaque, Sharif, "Redirected Walking", In Doctoral Dissertation of University of North Carolina, Jan. 1, 2005, 202 Pages.
Razzaque, et al., "Redirected Walking", In Proceedings of Eurographics, vol. 9, Sep. 2001, 6 Pages.
Redmon, Joseph, "Darknet: Open Source Neural Networks in C", Retrieved From https://pjreddie.com/darknet/, Retrieved on: Oct. 23, 2018, 4 Pages.
Scavarelli, et al., "VR Collide! Comparing Collision-Avoidance Methods Between Co-located Virtual Reality Users", In Proceedings of the CHI Conference Extended Abstracts on Human Factors in Computing Systems, May 6, 2017, 21 Pages.
Serafin, et al., "Estimation of Detection Thresholds for Acoustic Based Redirected Walking Techniques", In Proceedings of IEEE Virtual Reality, Mar. 18, 2013, pp. 161-162.
Serino, et al., "Pokemon Go and Augmented Virtual Reality Games: a Cautionary Commentary for Parents and Pediatricians", In Journal of Current Opinion in Pediatrics, vol. 28, Issue 5, Oct. 2016, Oct. 1, 2016.
Simeone, et al., "Substitutional Reality: Using the Physical Environment to Design Virtual Reality Experiences", In Proceedings of the 33rd Annual ACM Conference on Human Factors in Computing Systems, Apr. 18, 2015, pp. 3307-3316.
Sra, et al., "Oasis: Procedurally Generated Social Virtual Spaces from 3D Scanned Real Spaces", In Journal of IEEE Transactions on Visualization and Computer Graphics, vol. 24, Issue 12, Dec. 2018, Dec. 1, 2018, pp. 1-14.
Sra, et al., "Procedurally Generated Virtual Reality from 3D Reconstructed Physical Space", In Proceedings of the 22nd ACM Conference on Virtual Reality Software and Technology, Nov. 2, 2016, pp. 191-200.
Sra, et al., "VMotion: Designing a Seamless Walking Experience in VR", In Proceedings of the Designing Interactive Systems Conference, Jun. 9, 2018, 12 Pages.
Steinicke, et al., "Analyses of Human Sensitivity to Redirected Walking", In Proceedings of the ACM symposium on Virtual reality software and technology, Oct. 27, 2008, 8 Pages.
Suma, et al., "Impossible Spaces: Maximizing Natural Walking in Virtual Environments with Self-Overlapping Architecture", In IEEE Transactions on Visualization and Computer Graphics vol. 18, Issue 4, Mar. 9, 2012, pp. 555-564.
"International Search Report and Written Opinion Issued in PCT Application No. PCT/US20/016000", dated Jun. 16, 2020, 10 Pages.

* cited by examiner

REALITY-GUIDED ROAMING IN VIRTUAL REALITY

BACKGROUND

Virtual reality technology employs specialized computing hardware and software to provide users with perceptually-real and fully-immersive virtual environments to interact with and explore. Virtual reality technologies can place users into virtual, computer-generated environments, where they can perceive and interact with virtual objects rendered therein. While virtual environments and the virtual objects within them may appear present in a user's perceived virtual environment, they are typically not present in the user's immediate physical world. The same can generally be said about the converse, more specifically, that objects present in the user's immediate physical environment are typically not present in the user's perceived virtual environment.

Virtual environments and virtual objects perceived in virtual reality are graphically rendered for stereoscopic display, to be perceived by a user wearing fully-immersive virtual reality equipment, such as a head-mounted display. By virtue of its fully-immersive nature, virtual reality technology restricts the user's ability to view their physically-surrounding environment, or in other words, the user's real world surroundings. There is, in essence, a clear disconnect between a user's real world environment and a fully-immersive virtual environment in which the user is perceiving within the real world environment.

SUMMARY

Embodiments described herein provide systems and techniques for dynamically rendering and updating a fully-immersive virtual environment to safely guide real-world roaming. More specifically, a computing device coupled to a head-mounted display (HMD) receives sensor data from a plurality of sensors. In essence, the sensors track, among other things, the surrounding physical environment and physical obstacles therein, generating sensor data that corresponds to physical objects or obstacles present in the surrounding physical environment. The sensor data is processed by the computing device in real-time to dynamically render and update a fully-immersive virtual environment that at least partially corresponds to the tracked surrounding physical environment and physical obstacles. The virtual environment is dynamically adjusted to influence the user's course and avoid both static and moving obstructions detected in the real-world. In other words, the virtual environment is updated on-the-fly to redirect the user's real-world traversal path and prevent collisions. In this way, a user wearing the HMD can safely traverse (e.g., roam, walk about) a real-world environment while staying completely immersed in (i.e., perceiving only) the virtual environment.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
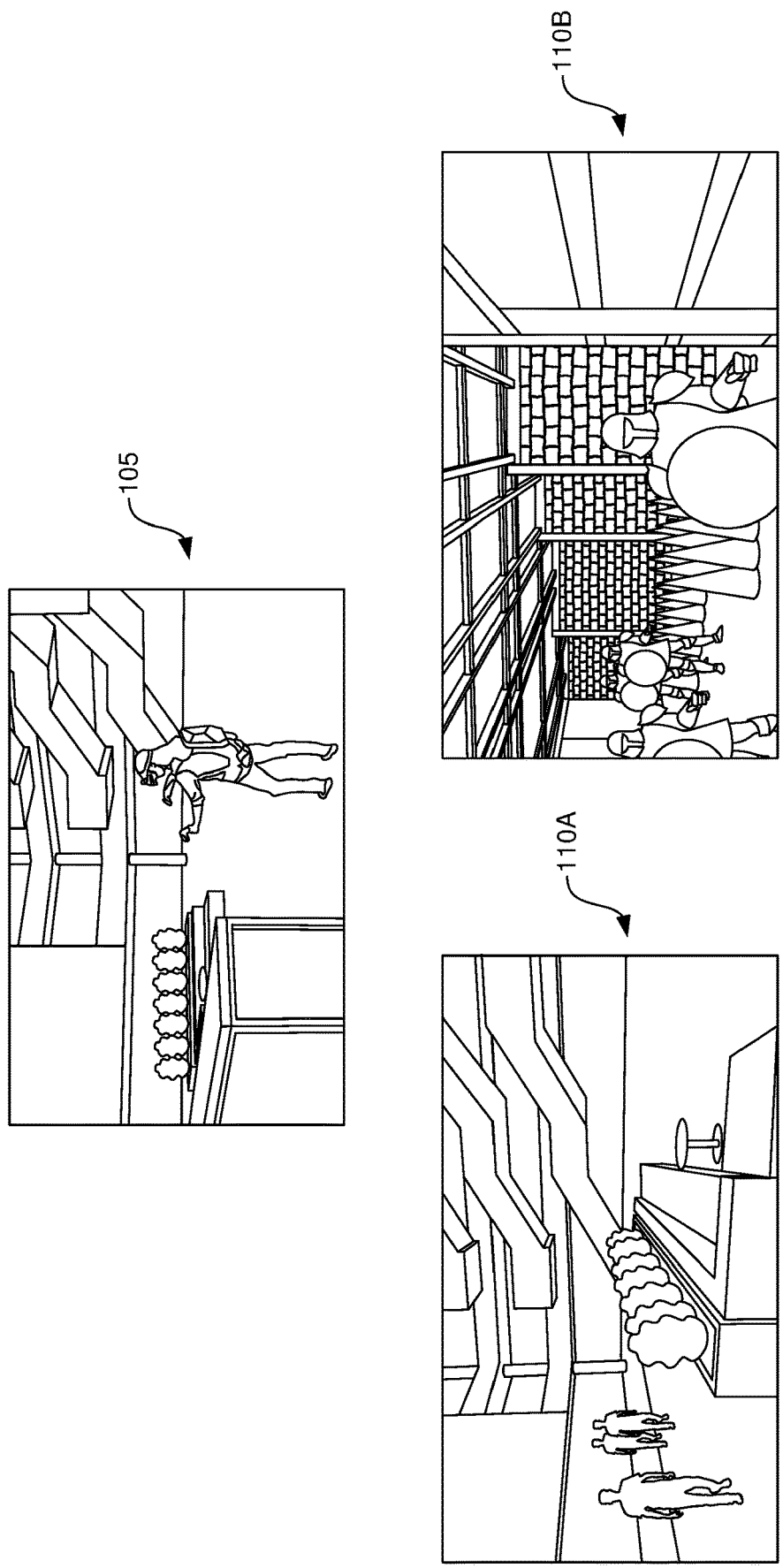
FIG. 1 depicts a variety of illustrations showing an exemplary operating environment and exemplary implementations for rendering and updating a virtual environment and/or virtual objects on-the-fly based on sensor data, in accordance with some embodiments of the present disclosure.

Immersive technology refers to perceptual and interactive technologies that, in essence, blur the line between the physical world and the simulated world. Perceptual technologies can trick a user's brain into believing that digital information being perceived in virtual space is real. Interactive technologies, on the other hand, can recognize user outputs (e.g., speech, gestures, movements, etc.) detected in physical space, and can respond to it in virtual space, accordingly. Together, perceptual and interactive technologies can provide users with an illusion that an immersive virtual environment or "virtual world" is just as real as the physical environment or "physical world" in which they are present.

Virtual reality (VR) is a fully-immersive technology, where a user of the technology can only perceive a rendered virtual environment and virtual objects therein, as if the perceived visual information was their present reality. While immersed in the virtual world, typically when wearing a head-mounted display (HMD), the user is visually disconnected from the real world. In other words, while a user can still physically roam about in the real world, the user can only perceive the displayed virtual world and the virtual objects therein. The disconnect between the perceived virtual world and the masked physical world presents a drawback in user experience. More specifically, there is a sensory disconnect for the user, between knowing what is within their surrounding physical environment, while being immersed in the virtual world. This disconnect not only limits the potential of virtual reality experiences, but also poses a hazard to the user, who can easily collide with objects within the physical world without awareness.

Various efforts have been made to address the drawbacks of this sensory disconnect. For instance, conventional VR systems oftentimes rely on the use of large empty spaces, such as an empty room or warehouse, having relatively no obstructions that could potentially interfere with a user's roaming path. Other conventional VR systems include optical scanners that must scan the entirety of a static physical space to generate a model from which a virtual world can be reconstructed. These conventional VR systems, however, require that the physical environment remains unchanged between uses. Such implementations are impractical, however, as they do not facilitate portability to unfamiliar environments, or account for the true dynamic nature of the real world. More specifically, conventional VR systems do not safeguard users against collisions with physical obstructions when physically roaming in new or dynamic real-world environments while fully-immersed in virtual reality.

As will be utilized throughout the present disclosure, the terms "real-world" or "physical" can be used interchangeably, both corresponding to tangible or non-virtual environments or objects. Moreover, the term "on-the-fly" or "real-time" are interchangeably referenced to correspond to a responsive behavior, such as the performance of an operation in response to the receipt of data or a signal (e.g., from a sensor). While such responsive behaviors may be limited in speed or response times in some situations, it is contemplated that the responsive behavior is performed in a manner that is preferably substantially instantaneous (e.g., less than 1 second). Further, as will be utilized throughout the present disclosure, the terms "render" and "generate" are interchangeably referenced to correspond to the digital creation of a virtual object or environment, such as one that can be provided for display to a HMD. The terms "object" and "obstruction" are also interchangeably referenced to correspond to "things" that are perceivable whether in a virtual or physical environment. An object or obstruction typically includes walls, people, animals, furniture, plants, or any tangible that could potentially interfere with a user's path of traversal. In some aspects, objects or obstructions can be detected based on sensor data, and typically includes any object that is determined taller than a reference height (e.g., a floor height determined based no sensor data). As one of ordinary skill in the art may appreciate, a movement (e.g., traversal, walking, roaming) within a physical environment can correspond to perceived movement within a virtual environment. That is, as a user changes his/her location (e.g., takes a step) in their physical environment, a corresponding change in location can be perceived in the perceived virtual environment. In this regard, in some aspects, dimensions (e.g., width, length, height, relative distance) of a physical object in a physical environment can correspond to a virtual object in a virtual environment.

At a high level, embodiments of the present disclosure generally provide systems and methods for dynamically rendering and updating a fully-immersive virtual environment or "scene" in real-time, to safely guide real-world roaming within an unfamiliar (e.g., not pre-scanned or modeled) or dynamic physical environment. In other words, various embodiments disclosed herein can track a user's physical environment to facilitate on-the-fly virtual scene adaptation to keep the user safe from collisions. In various embodiments, a computing device coupled to a head-mounted display (HMD) receives sensor data from a plurality of sensors that track the HMDs position, orientation, and surrounding physical environment, among other things. In various aspects, some of the sensors can generate tracking data (e.g., orientation, position, movement) associated with the HMD based on detected movements of the HMD. Some other sensors can generate environmental data (e.g., depth frames) based on physical objects or obstructions detected within the physical environment. The tracking data and environmental sensor data is processed by the computing device, on-the-fly, to responsively render a fully-immersive virtual environment. As the user roams about the physical environment and the HMD is displaced, the computing device continuously updates the rendered fully-immersive virtual environment, emulating the user's virtual movement about the virtual environment on-the-fly, based on newly received tracking data and environmental data. The virtual environment is dynamically adapted to influence the user's course of travel, responsively rendering and/or moving, within the virtual environment, virtual objects that correspond to static or dynamic physical objects detected in the real-world. In other words, the virtual environment is updated on-the-fly to redirect the user's real-world traversal path and prevent collisions with physical objects in the real-world. In this way, a user wearing the HMD can safely traverse (e.g., roam, walk about) the real-world environment while staying completely immersed in (i.e., perceiving only) the virtual environment.

A brief overview of the various embodiments disclosed herein are further provided with reference to FIGS. 1-5. With reference to FIG. 1, an illustration 105 depicts a user roaming a physical environment while wearing a HMD coupled to a computing device in accordance with some embodiments of the present disclosure. The HMD provides the user with a fully-immersive virtual reality experience, such that the user can only perceive the virtual environment that is being stereoscopically rendered by the computing device and displayed by the HMD. Another illustration 110A depicts an exemplary visual image of what the user may perceive from his/her field of view if not wearing the HMD and not fully immersed in the virtual environment. The illustration 110A depicts various exemplary static physical objects (e.g., couches, chairs, walls, plants, tables), in addition to exemplary dynamic physical objects (e.g., people, push carts).

In contrast to illustration 110A, illustration 110B depicts an exemplary visual image of what the user may perceive from the same field of view while wearing the HMD and fully immersed in the virtual environment. In accordance with various embodiments, the computing device can employ sensors that continuously track the HMD's orientation, position, location, and physical environment, among other things. Based on sensor data collected from the sensors, the computing device can render and update, as the sensor data is received, a virtual environment including virtual objects corresponding to physical objects detected within the physical environment. In this regard, illustration 110B depicts a virtual environment (e.g., a dungeon) having various virtual objects (e.g., knight, spikes, walls) therein. The computing device can determine, based on received sensor data corresponding to the physical environment, that physical objects are present and obstruct (e.g., are physically higher than the ground) a physically navigable pathway. In some aspects, the computing device can determine that certain physical objects (e.g., people) are moving while others (e.g., couches, chairs, plants) are not moving. As such, the computing device can select a moving virtual object (e.g., a knight) for a determined moving physical object, and select a non-moving virtual object (e.g., spikes from the ground) for a determined non-moving physical object. Other techniques, such as visual classification, feature (e.g., height, speed, characteristic) detection, or the like, can be employed to select a moving or non-moving virtual object, and even a particular moving or non-moving virtual object.

Figure 2:
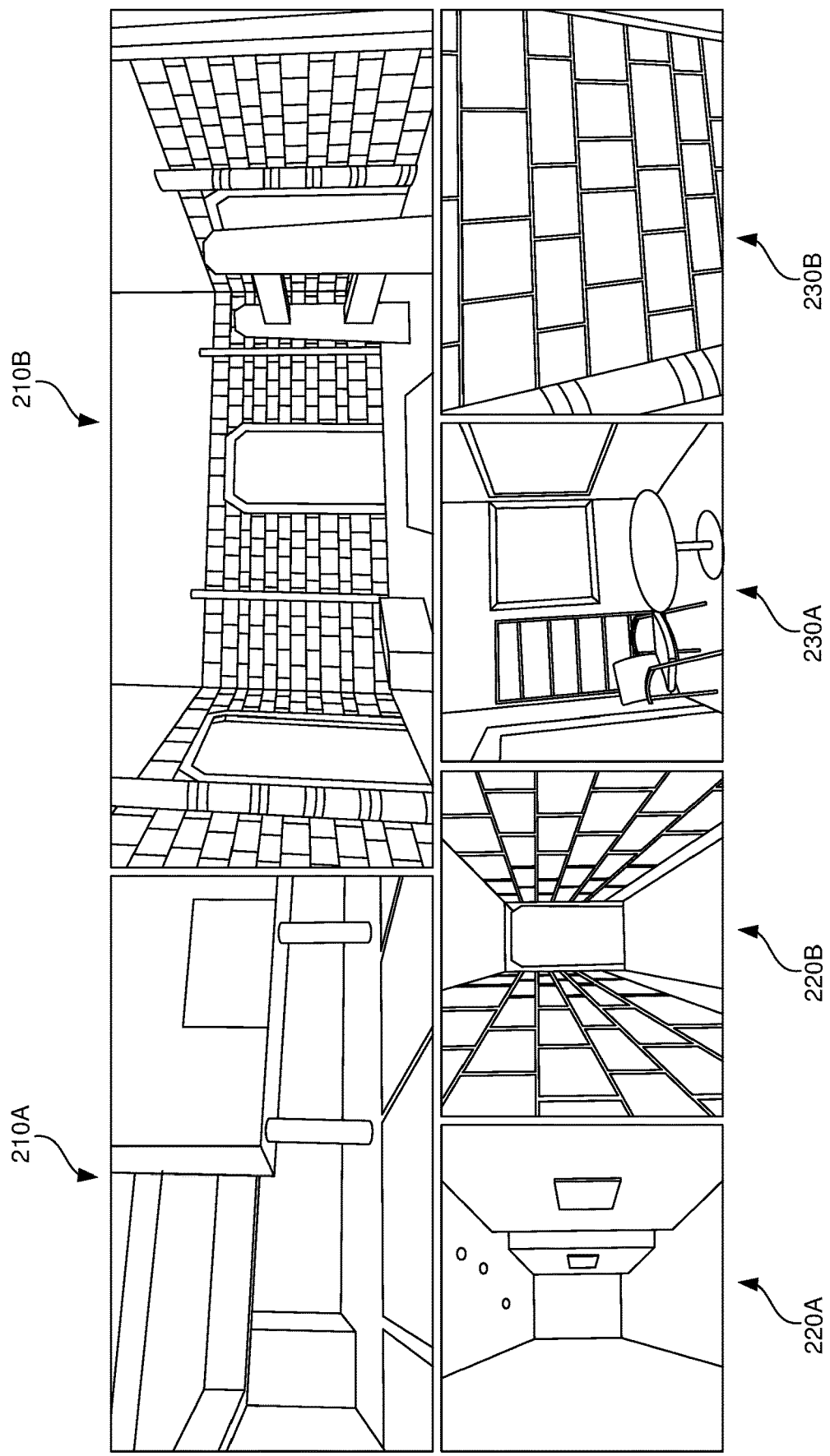
FIG. 2 depicts a variety of illustrations showing exemplary implementations for rendering and updating a virtual environment and/or virtual objects on-the-fly based on sensor data, in accordance with some embodiments of the present disclosure.

With reference now to FIG. 2, various illustrations are provided to depict exemplary implementations of rendering and updating a virtual environment and/or virtual objects corresponding to a physical environment and/or physical objects on-the-fly, in accordance with some embodiments of the present disclosure. Illustration 210A depicts an exemplary visual image of what the user may perceive from his/her field of view if not wearing the HMD and not fully immersed in the virtual environment. In contrast to illustration 210A, illustration 210B depicts an exemplary visual image of what the user may perceive from the same field of view while wearing the HMD and fully immersed in the virtual environment. As can be seen in the virtual environment presented in illustration 210B, the virtual environment is bounded by a first virtual wall that corresponds to a physical obstruction (e.g., wall, structure) in the physical environment. The virtual environment is also bounded by a second virtual wall to the left and a third virtual wall to the right. While illustration 210A does not depict physical obstructions to the left or right, it is contemplated that the physical areas beyond the second and third virtual walls could be physically navigable or have other physical objects therein. The second and third virtual walls depicted in 210B are rendered by the computing device to effectively postpone a rendering and updating of the virtual environment for those corresponding physical areas, until more sensor data corresponding to such areas is received (e.g., the user is closer to these physical areas). To this end, in some embodiments, the computing device can generate virtual rooms (e.g., virtual wall-bounded areas) or virtual corridors (e.g., virtual hallways) on-the-fly to effectively limit the amount of rendering and/or updating of a virtual environment based on physical environment at any given time, thereby providing a smoother and more efficient physical-to-virtual experience.

In some aspects, if sensor data indicates that physical space (as depicted in illustration 210A) is sufficient to render a virtual room, a virtual room (as depicted in illustration 210B) can be rendered. In some instances, however, the sufficiency of physical space can be undeterminable. Thus, if sufficient physical space beyond a particular physical area is undeterminable (e.g., outside of the sensor's field of view, not enough data collected), the computing device can employ one or more virtual guidance techniques that directs a user to move closer to that particular physical location so that additional sensor data can be collected. For instance, a virtual door or other virtual obstruction can be placed along a virtual wall or in a virtual corridor, which can present a realistic obstruction that prevents the user from perceiving what lies ahead. Such virtual obstructions can be rendered to correspond with physical boundaries that are either detected, programmatically defined, or yet to be reconstructed based on limited sensor data or processing state, among other things.

By way of example, illustration 220A depicts an exemplary visual image of what the user may perceive from his/her field of view if not wearing the HMD and not fully immersed in the virtual environment. In contrast to illustration 220A, illustration 220B depicts an exemplary visual image of what the user may perceive from the same field of view while wearing the HMD and fully immersed in the virtual environment. In this example, the computing device can determine based on received sensor data that physical walls of a physical hallway exist (as depicted in illustration 220A), as they are relatively close to the sensors, but cannot determine what lies ahead, whether due to sensor resolution, lighting conditions, processing or programming limitations, or the like. As such, the computing device can render virtual walls (as depicted in illustration 220B) that correspond to the physical walls (as depicted in illustration 220A), and render a virtual door (depicted in illustration 220B) that directs a user to move down the physical hallway until additional sensor data can be collected. In some aspects, once the user reaches a physical location corresponding to the virtual door, the virtual door can be opened automatically upon reaching the corresponding physical location, or opened based on a detected user input (e.g., a sensed physical interaction or other input), among other techniques. As new sensor data is collected at the corresponding physical location, the computing device can render another virtual environment and/or virtual object based on the new sensor data accordingly.

In some aspects, sensor data can indicate that a user simply cannot move out of a physical area. By way of example, illustration 230A depicts an exemplary visual image of what the user may perceive from his/her field of view if not wearing the HMD and not fully immersed in the virtual environment. In contrast to illustration 230A, illustration 230B depicts an exemplary visual image of what the user may perceive from the same field of view while wearing the HMD and fully immersed in the virtual environment. In this example, the computing device can determine that physical walls of a physical room exists, or that objects completely block a navigable path of the user (as depicted in illustration 230A). As such, the computing device can render virtual walls (as depicted in illustration 230B) that correspond to the physical walls or the physical objects, rendering a completely closed virtual room from which the user cannot escape.

In some aspects, the computing device may simply limit one or more dimensions of a rendered virtual room or virtual corridor. In some aspects, as briefly described, a virtual room or virtual corridor can be generated based on a determination that received sensor data indicates the presence of one or more surrounding walls or unpassable obstructions within the physical environment. In some further aspects, the virtual room or virtual corridor can be generated based on the foregoing, in addition predefined virtual dimensions that limit the one or more dimensions of a generated virtual room or corridor. In essence, the predefined virtual dimensions may limit the dimensions of any generated virtual room, even if the sensor data indicates that physical dimensions extending beyond corresponding virtual dimensions is at least partially free of physical obstructions. In this way, the predefined virtual dimensions can facilitate a variety of benefits, whether relating to computing efficiency or user experience.

Figure 3:
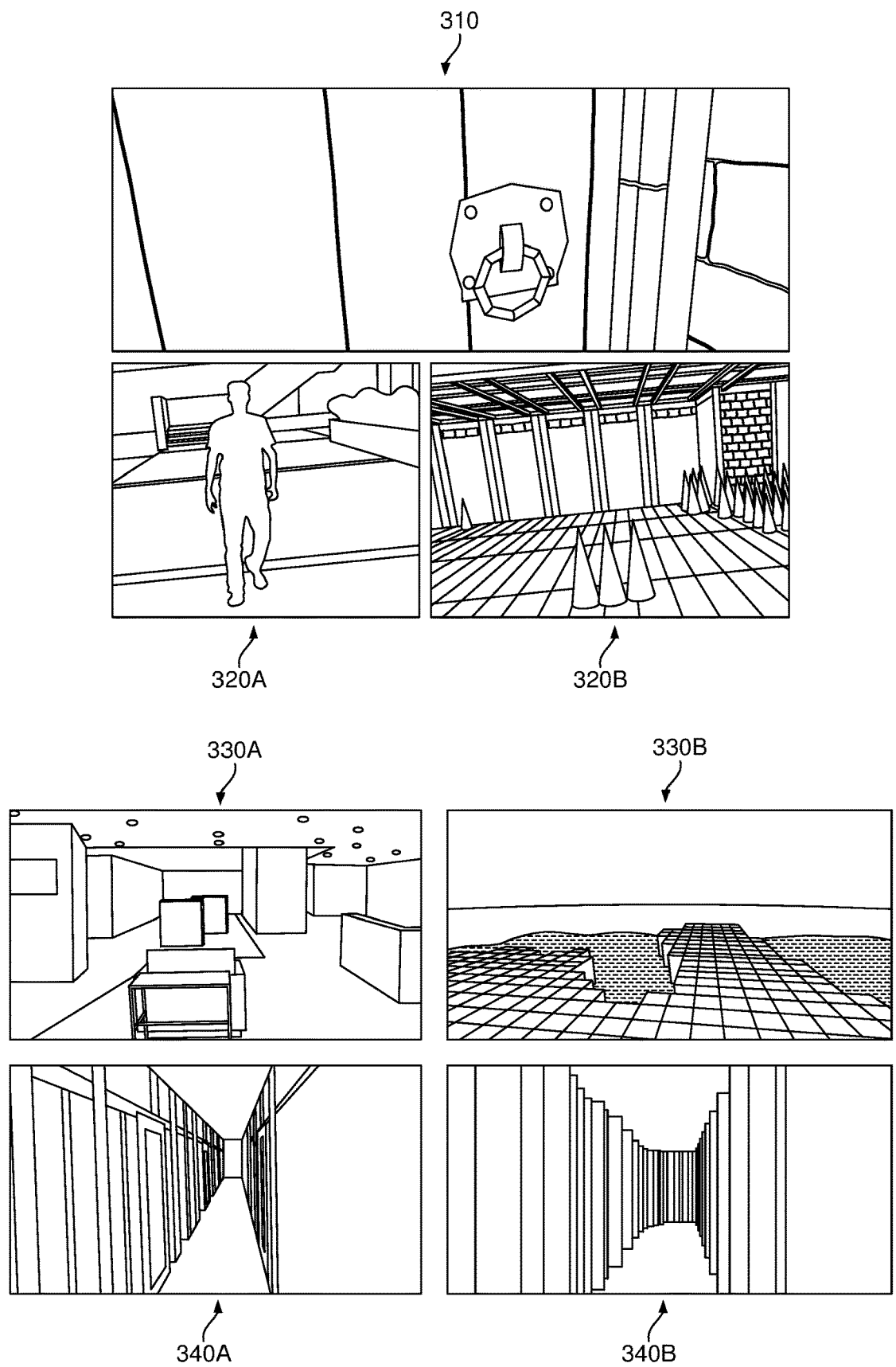
FIG. 3 depicts a variety of illustrations showing exemplary implementations for rendering and updating a virtual environment and/or virtual objects on-the-fly based on sensor data, in accordance with some embodiments of the present disclosure.

Looking now to FIG. 3, various illustrations are provided to depict exemplary techniques employed to mitigate lag or reduce delays while rendering a virtual environment and virtual objects on-the-fly, and also maintain a realistic and thematic virtual experience, in accordance with some embodiments of the present disclosure. Illustration 310 depicts an exemplary visual image of what the user may perceive (e.g., a virtual door) from their field of view while wearing the HMD and fully immersed in the virtual environment. The virtual door can be rendered to indicate that there may be a navigable area beyond where the user is standing in the physical world. In various embodiments, a virtual door (or any other virtual obstruction) can be rendered to guide a user to physically approach a corresponding physical location of the virtual door in the physical environment. In some embodiments, the virtual door can lead to an undiscovered room, or in other words, a virtual area that is yet to be perceived by the user. In some aspects, the virtual door can be opened if the computing device, based on sensor data received at or near the location of the virtual door, determines a physically navigable area is available beyond a location of the virtual door. In some other aspects, the computing device may determine that sensor data indicates that the corresponding area is not physically navigable, and prevents the virtual door from opening.

Assuming that the virtual door is opened, the opening of the virtual door can reveal another virtual room or corridor, among other things. Illustration 320A depicts an exemplary visual image of what the user may perceive from his/her field of view if not wearing the HMD and not fully immersed in the virtual environment after the virtual door is opened. The illustration 320A depicts a physically navigable area with a pedestrian standing in front of the user. In some embodiments, the computing device can determine based on received sensor data that a physical object (e.g., the pedestrian from the physical environment) is present (e.g., standing in front of the user). As such, the computing device can render a virtual object that corresponds to the detected physical object. Illustration 320B depicts an exemplary corresponding visual image of what the user may perceive from his/her field of view while wearing the HMD and fully immersed in the virtual environment. The illustration 320B depicts a thematically consistent room (e.g., consistent with a dungeon theme) having a navigable path partially blocked with a thematically consistent virtual obstruction (e.g., virtual spikes arising from the ground). The virtual location of the virtual obstruction corresponds to the physical location of the physical object (e.g., the pedestrian of illustration 320A).

In some embodiments, the computing device can determine one or more characteristics of the physical object based on received sensor data, such as a movement of the physical object (e.g., relative to the sensor(s)), a velocity of the movement, one or more dimensions of the physical object, or a relative physical distance of the physical object to the sensor(s), among other things. Based on any one or more characteristics, the computing device can select one of a plurality of virtual objects to insert into the virtual environment as a virtual representation of the physical object. In some aspects, to maintain thematic consistency and avoid an awkward or sudden appearance of certain virtual objects, a thematically consistent virtual object (e.g., spikes arising from the virtual floor of illustration 320B) can be selected for insertion into the virtual environment. In this non-limiting example, a rising mechanism (i.e., the virtual spikes) is thematically consistent (e.g., dungeon theme) and also facilitates a realistic virtual experience, even if the physical object is detected moments ago (e.g., the object just steps into the user's navigable area, the user just turns towards the physical object). In this instance, the computing device selects the rising mechanism as a virtual representation because the physical object was not moving, and a determination was made that the physical object was physically located within a threshold relative distance from the sensor(s) and/or HMD.

Illustrations 330A-330B provide further examples of visual images, depicting a physical environment having physical objects (as depicted in illustration 330A) and a corresponding virtual environment having virtual objects (as depicted in illustration 330B), each perceived from a user from his/her field of view in respective non-immersed (i.e., physical) and fully-immersed (i.e., virtual) environments. Illustration 330B depicts a virtual "lava land" that portrays a determined physical navigable path, while rising mechanisms (e.g., walkable tiles) or falling mechanisms (e.g., sinking tiles) can be employed to virtually represent detected physical obstructions or un-navigable paths, among other things. Similarly, illustrations 340A-340B provide additional examples of visual images, depicting a physical environment (e.g., an office hallway as depicted in illustration 340A) and a corresponding virtual environment (as depicted in illustration 340B) having a Tron-like effect that, in essence, presents the determined navigable area or path and detected obstructions (e.g., walls or other obstructions in the office hallway).

Figure 4:
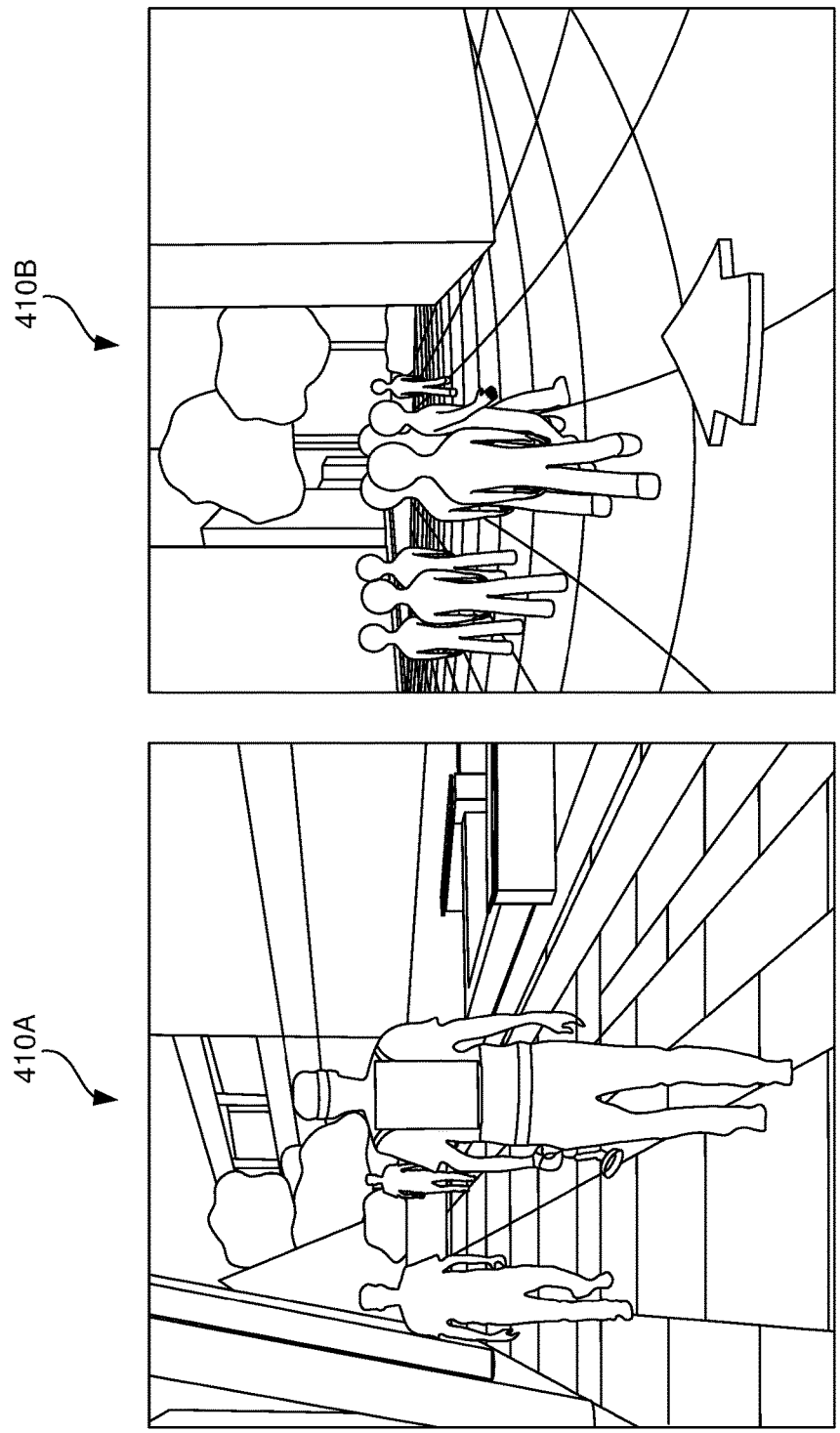
FIG. 4 depicts a variety of illustrations showing exemplary implementations for rendering and updating a virtual environment and/or virtual objects on-the-fly based on sensor data, in accordance with some embodiments of the present disclosure.

With reference now to FIG. 4, an illustration 410A depicts a user roaming an outdoor (e.g., not-bounded by walls) physical environment while wearing a HMD coupled to a computing device in accordance with some further embodiments of the present disclosure. Similar to the described embodiments with reference to FIG. 1, the HMD provides the user with a fully-immersive virtual reality experience, such that the user can only perceive the virtual environment that is being stereoscopically rendered by the computing device and displayed by the HMD. In illustration 410A, the physical environment in which the user is roaming is outdoors, or in other words, in an area not-bounded by physical walls of a building structure. The illustration 410A depicts various exemplary static physical objects (e.g., buildings, tables, benches), in addition to exemplary dynamic physical objects (e.g., people walking). In contrast to illustration 410A, illustration 410B depicts an exemplary visual image of what the user of illustration 410A may perceive from his/her field of view while wearing the HMD and fully immersed in the corresponding virtual environment.

As noted, the computing device can employ sensors that continuously track the HMD's orientation, position, location, and physical environment, among other things. Based on sensor data collected from the sensors, the computing device can render and update, as the sensor data is received, a virtual environment including virtual objects corresponding to physical objects detected within the physical environment. In some aspects, the sensors can include a location sensor, such as a navigational sensor or global positioning system (GPS), that can track its location (and thereby the user) at any given time. It is contemplated that any type of sensor or set of sensors capable of determining location (e.g., Bluetooth, Wi-Fi, cell or radio-tower triangulation, among other things) can be employed within the purview of the present disclosure. In this regard, the computing device can employ an electronic map or other navigational data that can determine a location of the user with respect to his/her physical surroundings at any given time. By determining the user's location on a map, such as an overhead map depicting a bird's eye view of the user's location, the computing device can determine where physical obstructions (e.g., trees, curbs, buildings) or areas of avoidance (e.g., streets, water, private property) may be positioned relative to the user's location.

In this regard, illustration 410B depicts a virtual environment (e.g., a city street) having various virtual objects (e.g., buildings, pedestrians) therein. The computing device can determine, based on received sensor data corresponding to the physical environment, that physical objects are present and obstruct (e.g., are physically higher than the ground) a physically navigable pathway. In some aspects, the physically navigable pathway can be determined based on the map data and the user's determined location. Further, locations of physical obstructions can be determined based on their known locations according to the map data and their relative positions to the user. In some aspects, the computing device can determine that certain physical objects (e.g., people, vehicles, animals) are moving while others (e.g., bushes, tables, chairs, parked) are not moving. As such, the computing device can select a moving virtual object (e.g., a pedestrian) for a determined moving physical object, or select a non-moving virtual object (e.g., bush, tree) for a determined non-moving physical object. Other techniques, such as visual classification, feature (e.g., height, speed, characteristic) detection, or the like, can be employed to select a moving or non-moving virtual object, and even a particular moving or non-moving virtual object. In some embodiments, if a determination is made that a user is navigating an outdoor environment, the computing device can select a moving virtual object to represent all unknown physical objects, or in other words, detected physical objects that are not already determined present by way of the map data. In this way, in a lesser-controlled environment, such as an outdoor physical environment, the representation of any detected physical object can be represented with moving virtual objects generally, to facilitate the realism and truly dynamic nature of an outdoor physical environment.

Figure 5:
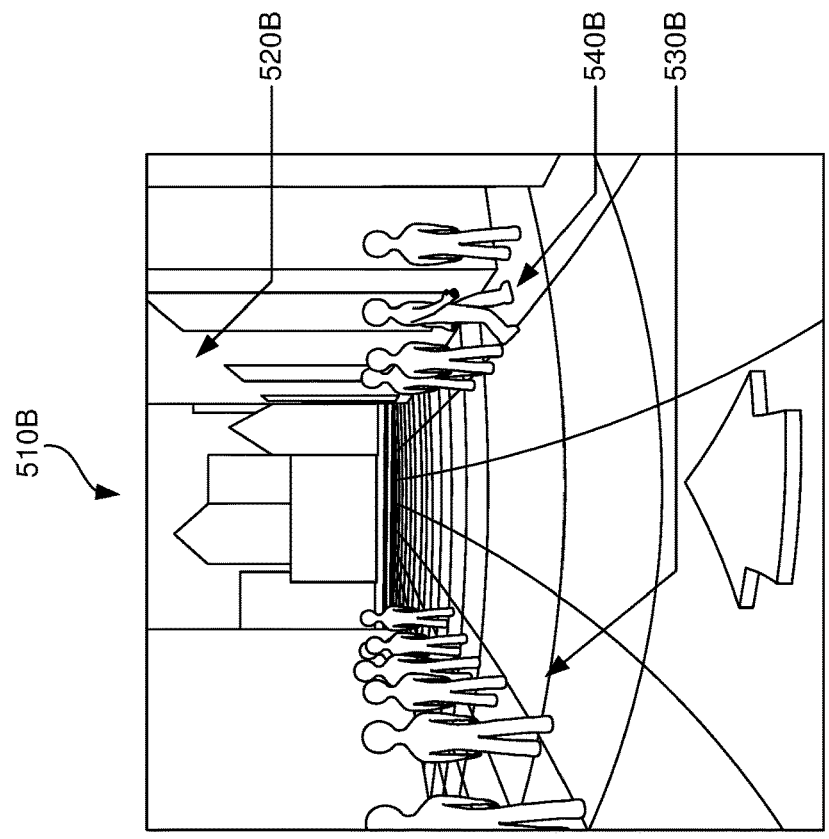
FIG. 5 depicts a variety of illustrations showing exemplary implementations for rendering and updating a virtual environment and/or virtual objects on-the-fly based on sensor data, in accordance with some embodiments of the present disclosure.
Figure 5:
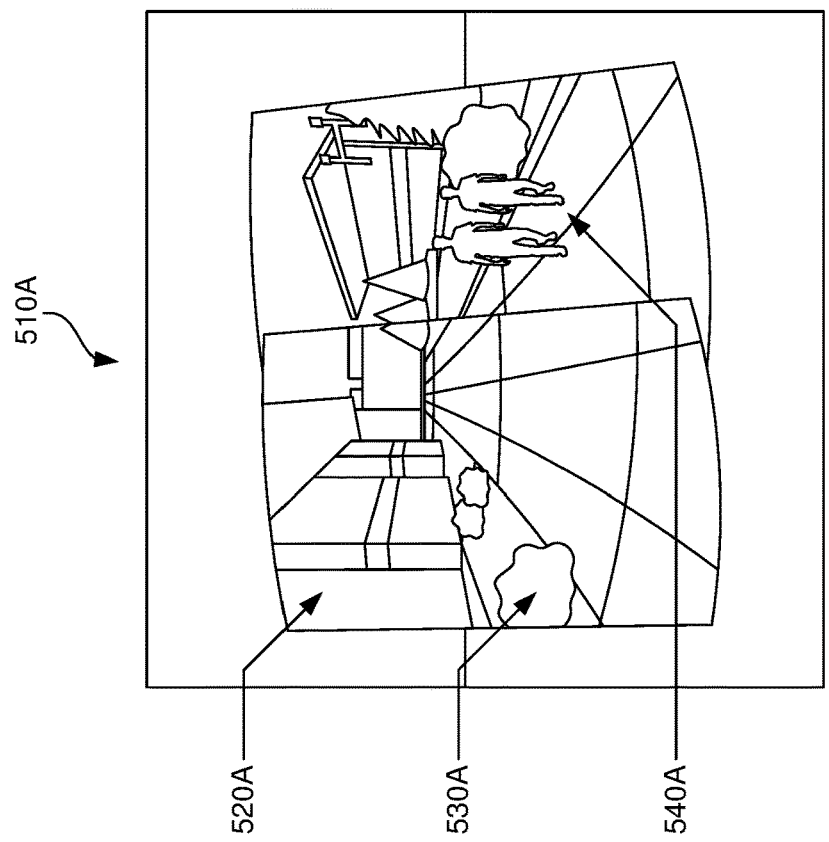

Looking now to FIG. 5, illustrations 510A-510B provide further examples of visual images, depicting a physical outdoor environment having physical objects (as depicted in illustration 510A) received as input by a set of sensors from a field of view, and a corresponding virtual environment having virtual objects (as depicted in illustration 510B) perceived by a user wearing a HMD from the same field of view. In various embodiments, the computing device can determine a relative location and/or dimensions of certain static physical obstructions (e.g., buildings, streets, or other unnavigable areas) relative to a user's physical location based on determined location data and obtained map data, among other things. Illustration 510A depicts an office building 520A having a location and/or dimensions that can be determined from map data. A location of the building 520A relative to the user's position can be determined based on the user's physical location and the known physical location of the building 520A. In this regard, the computing device can determine that a particular virtual obstruction is a static obstruction based on the corresponding physical object being defined in the map data, and render a corresponding static virtual object (e.g., virtual building 520B of illustration 510B) to correspond to the determined physical location and/or dimensions of the building 520A.

In some embodiments, physical objects detected by the sensor(s) and not corresponding to a physical object defined in map data can be determined as an ad-hoc physical object. In some aspects, an ad-hoc physical object (e.g., bush 530A) can be a static physical object or a dynamic physical object (e.g., pedestrians 540A). In some embodiments, the sensor(s) can detect an ad-hoc physical object and generate corresponding virtual objects to represent the detected ad-hoc physical objects. In a preferred embodiment, any or all determined ad-hoc physical objects can be represented with moving virtual objects, such as the virtual pedestrians 530B and 540B of illustration 510B. In some instances, the computing device can distinguish a static or dynamic ad-hoc physical object based on a variety of factors, such as detected movements, visual classification, or other associated characteristics detected via the sensor(s). The descriptions provided above in accordance with FIGS. 1-5 are provided to be illustrative of the various embodiments of the present disclosure, and are not intended to be limiting in any way.

Figure 6:
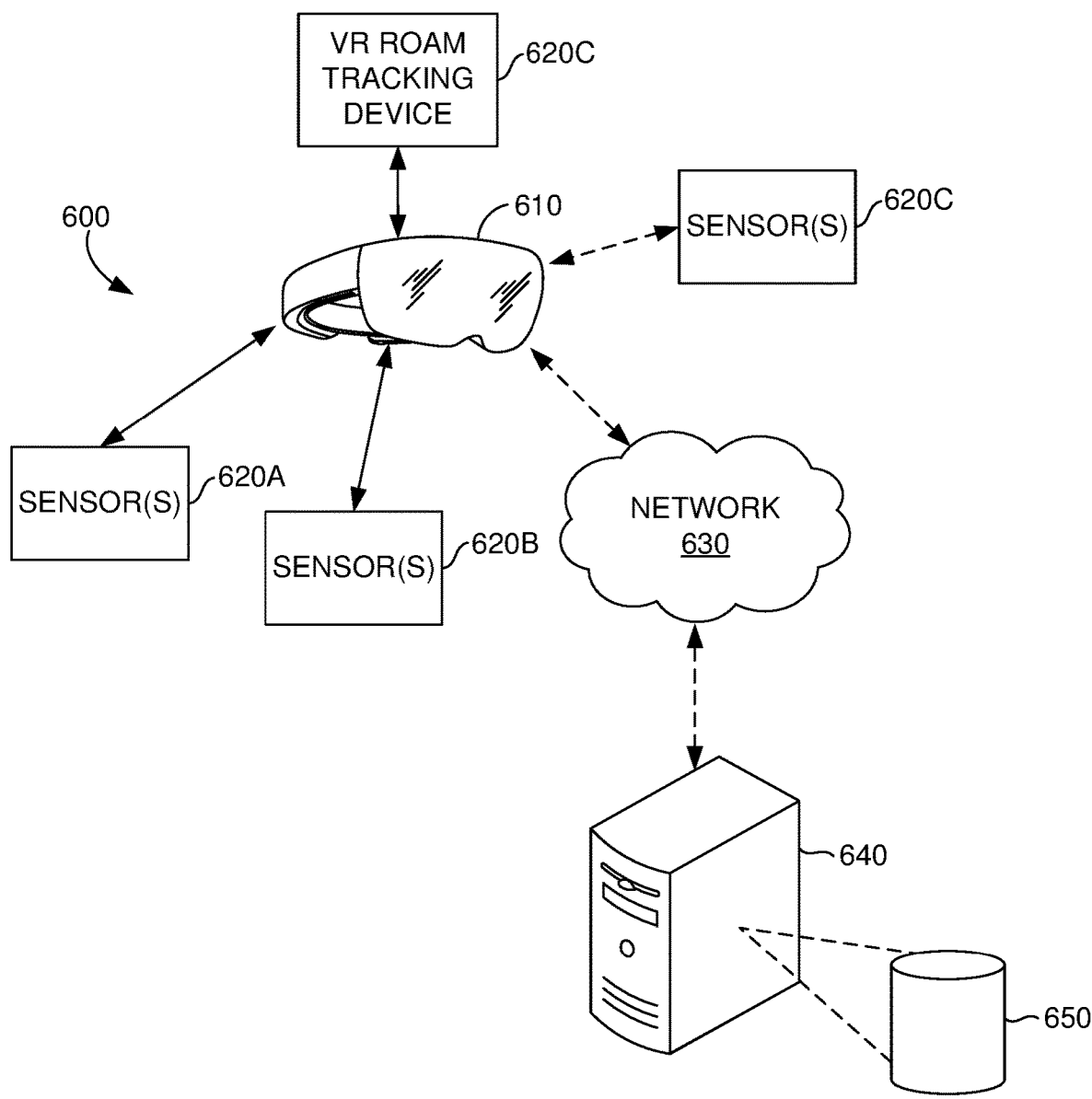
FIG. 6 is a block diagram of an exemplary operating environment for rendering and updating a virtual environment and/or virtual objects on-the-fly based on sensor data, in accordance with some embodiments of the present disclosure.

Turning now to FIG. 6, a block diagram is provided showing an example operating environment 600 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 600 includes a head-mounted display (HMD) coupled to a set of sensors, such as HMD 610 and sensor(s) 620a, 620b, 630c. The HMD 610 can include a stereoscopic display to facilitate a stereoscopic presentation of three-dimensional virtual environments and virtual objects that can be perceived by a user wearing the HMD 610. The HMD 610 can be coupled to a VR roam tracking device 615, which can be integrated into a body of the HMD 610, separate from the HMD 610 but physically coupled thereto, or wirelessly coupled to the HMD 610, to facilitate physical roaming about a physical environment while fully-immersed in a virtual environment. In some aspects, the VR roam tracking device 615 coupled to the HMD 610 can include a portable computing device, e.g., one that is carried or worn on the person of a user wearing the HMD 610.

In various embodiments, the set of sensors can include tracking sensors 620a (e.g., rotational tracking sensors, positional tracking sensors) that can generate sensor data employable by the VR roam tracking device 615 to determine a physical orientation of the HMD 610 and a physical position of the HMD 610 relative to the physical environment around it. In a preferred embodiment, the tracking sensors 620a are inside-out sensors, which include sensors that are secured to a body of the HMD 610. However, it is contemplated that a variety of sensors, including outside-in sensors, can be employed to facilitate the determination of, among other things, a physical orientation and/or physical position of the HMD 610.

In various embodiments, the set of sensors can further include a set of environmental sensors 620b (e.g., optical sensors) employable to receive environmental data (e.g., optical data, acoustic data) from the surrounding physical environment and determine, among other things, distances or other characteristics of physical objects within a tracking area (e.g., field of view) of the environmental sensor. By way of non-limiting example, the Microsoft Kinect® device is one exemplary environmental sensor (e.g., a depth map sensor or RGBD camera) that can continuously generate a real-time depth map for each frame of optical input information received thereby. In this regard, the VR roam tracking device 615 can receive each depth map frame generated by the environmental sensor to determine, among other things, distances, shapes, relative movements, or other physical characteristics of physical objects within the tracking area. In some aspects, an environmental sensor can also be employed by the VR roam tracking device 615 as a positional tracking sensor, by determining that a position of the HMD is moving relative to the physical environment being tracked by the environmental sensor. In a preferred embodiment, the set of environmental sensors 620b are inside-out sensors, which include sensor(s) that are secured to a body of the HMD 610. In some aspects, the set of environmental sensors is rigidly mounted to the HMD 610, aimed at a parallel view direction to the HMD 610. However, it is contemplated that a variety of sensors, including outside-in sensors, can be employed to facilitate the determination of, among other things, distances (e.g., relative to the HMD 610) or other characteristics of physical objects within corresponding tracking area(s) of the environmental sensor(s) 620b.

In some further embodiments, the set of sensors can further include a set of location sensors 620c, such as a GPS receiver, employable to determine physical location data (e.g., location coordinates from a satellite or other source) that corresponds to a physical location of the GPS receiver. In some alternative embodiments, the set of location sensors 620c can include Wi-Fi radios, Bluetooth radios, telecommunications radios, or any other transceiver that can be triangulated based on signals or characteristics thereof (e.g., signal strength, signal sources) received from source transmitters (e.g., Wi-Fi access points, Bluetooth beacons, telecommunications towers) within a detectable range of the set of location sensors 620c. In various embodiments, the VR roam tracking device 615 can receive sensor data from one or more location sensors 620c to determine, among other things, physical location coordinates of the sensor(s) (and thereby the user wearing the HMD 610), whether through receiving coordinates or triangulating an approximate location based on the received source signals, among other things. The VR roam tracking device 615 can employ the user's location coordinates to determine where the user is physically located relative to static physical obstructions that are depicted on an electronic map (e.g., a bird's eye perspective map), by way of example. It is contemplated that an electronic map can be stored locally in a memory of the VR roam tracking device 615, or can be accessed or retrieved utilizing a third-party mapping service via a network.

In some embodiments, the third-party mapping service can be hosted by a remote server device, such as server device 640. The server device 640 can be accessed by the VR roam tracking device 615 via a network 630, which can include a LAN, WAN, PAN, or the Internet, by way of example. The server device 640 can be coupled to a database 650 that can store, among other things, electronic map(s) or any other electronic data that can be accessed and/or retrieved by the VR roam tracking device 615. In some embodiments, location coordinates determined by the VR roam tracking device 615 can be communicated to the server device 640, causing the server device 640 to provide the VR roam tracking device 615 with an electronic map determined relevant to the location coordinates and/or a depiction of the received location coordinates on the determined relevant map, among other things.

Figure 7:
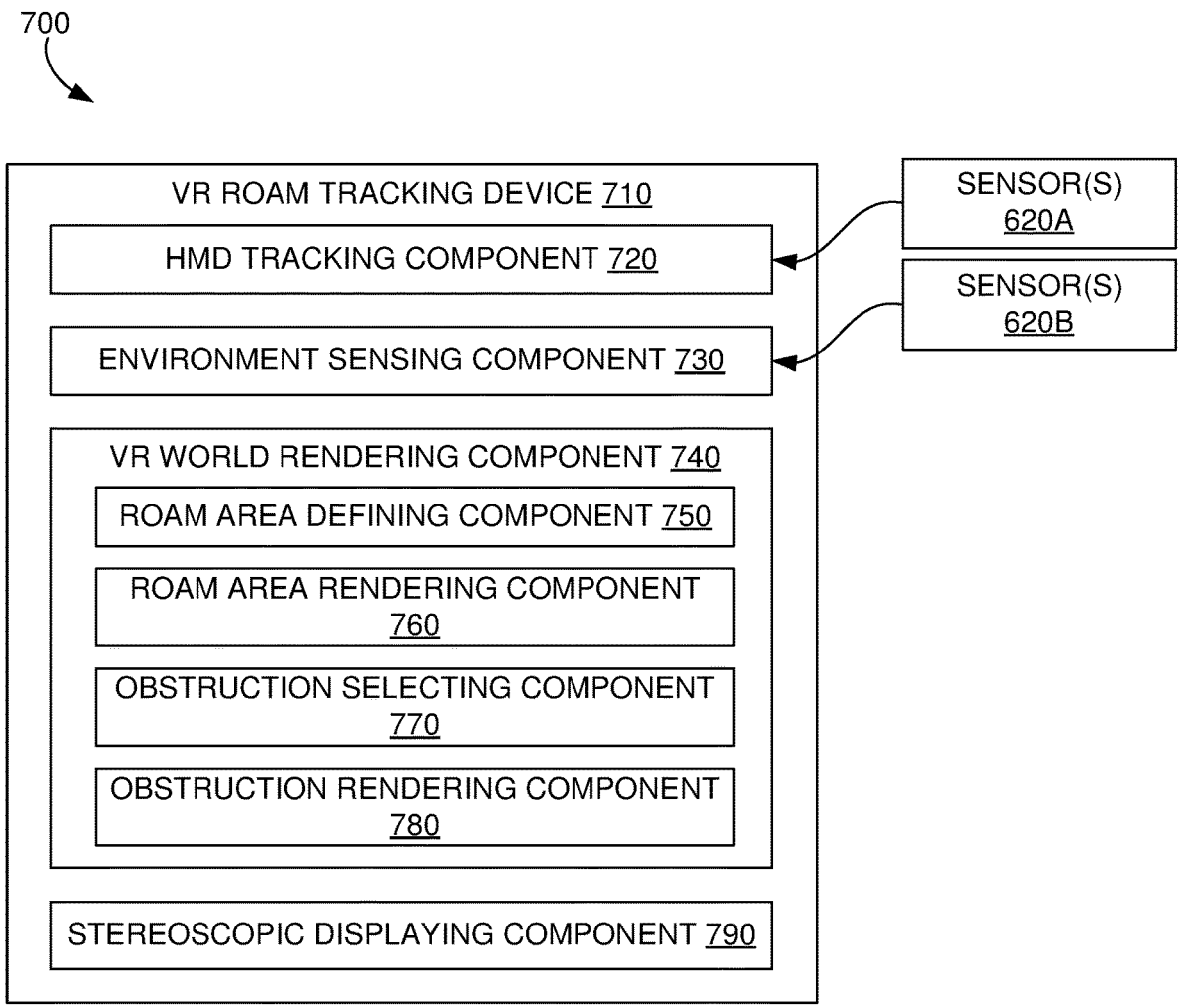
FIG. 7 is a block diagram of an exemplary VR roam tracking device for rendering and updating a virtual environment and/or virtual objects on-the-fly based on sensor data, in accordance with some embodiments of the present disclosure.

Turning now to FIG. 7, a block diagram 700 is provided, illustrating an exemplary VR roam tracking device 710, such as VR roam tracking device 615 of FIG. 6, for dynamically rendering and updating a fully-immersive virtual environment in real-time based on received sensor data. A VR roam tracking device 710 provided in accordance with the described embodiment, in an example, can safely guide real-world roaming within an unfamiliar (e.g., not pre-scanned or modeled) or dynamic physical environment. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The VR roam tracking device 710 is an example of a suitable architecture for implementing certain aspects of the present disclosure. It should be understood that any number of user devices, hardware, modules, or components within the scope of the present disclosure can be employed to perform the functions described in associated with the VR roam tracking device 710. In some embodiments, the VR roam tracking device 710 can include a computing device, such as the computing device 1500 described in relation to FIG. 15 herein. As each of the described components are depicted as being included in the VR roam tracking device 710, it is contemplated that any component depicted therein is not limited to the illustrated embodiment, and can be distributed among a plurality of computing devices, modules, or hardware devices, or in some instances, may be conflated into a single hardware device or module, such as a processor or hardware device. It is also contemplated that any one or more of the described components can be completely removed from the VR roam tracking device 710, so long as one or more operations described in correspondence to a removed component can be compensated for by one or more other components, or a third-party resource, remote computing device, or hardware device, among other things.

In some embodiments, the VR roam tracking device 710 can be coupled to head-mounted display (HMD), such as HMD 610 of FIG. 6. The VR roam tracking device 710 can also be coupled to a set of sensors, such as tracking sensor(s) 620a and environmental sensor(s) 620b. As briefly described in relation to FIG. 6, any one or more of the tracking sensor(s) 620a and/or environmental sensor(s) 620b can be integrated into or rigidly secured to the HMD in accordance with some embodiments.

The VR roam tracking device 710 can include a HMD tracking component 720 that receives tracking sensor data from the tracking sensor(s) 620a. The HMD tracking component 720 can determine, among other things, an orientation of the HMD based on the received tracking sensor data. The tracking sensor data can include electronic information that corresponds to a detected pitch, yaw, or roll of the HMD, among other things. In various embodiments, the tracking sensor(s) 620a can include an accelerometer, a gyroscope, a magnetometer, and other sensors for measuring cardinal direction, linear acceleration, and/or angular velocity of the HMD, among other inertial characteristics.

In some further embodiments, the HMD tracking component 720 can determine a position of the HMD in space (i.e., the physical environment) based on the received tracking sensor data. In this regard, the tracking sensor data can further include electronic information that corresponds to determined movements of the HMD in space, including forward/backward, up/down, and left/right movements of the HMD. In various embodiments, such tracking sensor(s) 620a can further include acoustic tracking sensors, optical sensors (e.g., utilizing passive and/or active markers, visible markers, non-existent markers, depth maps, or a combination thereof), QR tracking systems, cameras, or other sensors for tracking movements of the HMD in space.

In some further embodiments, the VR roam tracking device 710 can include an environment sensing component 730 that receives environmental sensor data from the environmental sensor(s) 620b. The environment sensing component 730 can determine, among other things, relative distances, shapes, and/or locations of physical objects in a tracking area (e.g., field of view) of the environmental sensor(s) 620b based on the received environmental sensor data. In some embodiments, the environmental sensor data can be received as individual frames (e.g., depth map frames) generated based on received optical information. The environmental sensor data (e.g., each frame) can include electronic information (e.g., depth map) that corresponds to one or more physical objects (e.g., ground, walls, people, animals, chairs, tables, plants, or any physical structure) detected within the field of view of environmental sensor(s) 620b at any given time. In some embodiments, environmental sensor(s) 620b can include, for instance, a depth map sensor or RGBD sensor. In various embodiments, environmental sensor(s) 620b can continuously receive optical information (e.g., images) from the physical environment and responsively (e.g., periodically) generate frames (e.g., depth maps) that correspond to the received optical information. The environment sensing component 730 can determine, for each generated frame, relative distances, shapes, and/or locations of physical objects in a tracking area (e.g., field of view) of the environmental sensor(s) 620b in response to receiving the generated frame. By way of a non-limiting example, Microsoft's Kinect device can be employed as a depth map camera. In some embodiments, a tracking sensor 620a can also operate as an environmental sensor 620b, or vice versa, such that the sensor data generated thereby can be employed by HMD tracking component 720 and/or environment sensing component 730 to both track movement of the HMD in space and determine relative distances, shapes, and/or locations of physical objects in a tracking area.

In some embodiments, the environment sensing component 730 can determine, among other things, that a physical object or "obstruction" is present in the tracking area of the environmental sensor(s) 620b based on the received environmental sensor data. In some aspects, the environment sensing component 730 can operate under an assumption that the physical environment in which the user is roaming has a flat planar ground, such that physical objects can be detected based on a determination that physical objects depicted in generated sensor data (e.g., environmental data) appear taller than the ground. However, in some embodiments, the foregoing assumption can be avoided by identifying certain physical objects (e.g., steps, curbs, ramps) that can be accounted for (e.g., utilizing visual recognition techniques) when making a determination on whether a physical object is an obstruction or a navigable area or pathway (e.g., flat planar ground, steps, curbs, ramps).

The VR roam tracking device 710 can further include a VR world rendering component 740. In various embodiments, the VR world rendering component 740 can generate a virtual environment or any portion thereof (e.g., a virtual scene or a portion of the virtual environment) that can be provided for display to a HMD, such as HMD 610 of FIG. 6, such that at least the portion of the virtual environment can be perceived by a user wearing the HMD. In some embodiments, the VR world rendering component 740 can generate the virtual environment, including virtual objects, any of which can correspond to physical objects within the user's surrounding physical environment based at least in part on one or more pieces of environmental sensor data (e.g., depth map frames) received via environment sensing component 730. In some further embodiments, the VR world rendering component 740 can generate the virtual environment, including virtual objects, corresponding to physical objects based further on a selected theme from one or more defined themes (e.g., décor, style, color scheme, subject, topic) stored in a memory of the VR roam tracking device 710. In this regard, a virtual environment and the virtual objects rendered therein can remain thematically consistent. In some aspects, a theme can be defined in a virtual game and selected automatically (e.g., based on a level or difficulty), or can be selected based on received user input from a list of themes provided for display via HMD, among other things.

The VR world rendering component 740 can include a roam area defining component 750 that can receive a piece of environmental sensor data (e.g., a depth map frame) and determine that a portion of the surrounding physical environment (i.e., the physical area captured by the depth map frame) corresponds to a navigable area, or in other words, the flat planar ground or other determinable surface or area on which the user can roam. In some embodiments, the roam area defining component 750 can receive a piece of environmental sensor data (e.g., depth map frame) via environment sensing component 730 and determine that at least a portion of the received piece of environmental sensor data corresponds to the navigable area. In some aspects, the roam area defining component 750 can determine that a portion of the received piece of environmental sensor data corresponds to the navigable area based on the portion having no determinable depth or relative distance, or having no determinable difference in height from a flat planar ground or other determinable surface or area.

The VR world rendering component 740 can further include a roam area rendering component 760 that generate (or render) a virtual navigable area (e.g., a virtual pathway, floor, ground, stairs, ramp) that corresponds to the navigable area determined by roam area defining component 750. In some embodiments, the roam area rendering component 760 can select a theme for the virtual navigable area that is consistent with a selected theme associated with the virtual environment. By way of example, the virtual navigable area depicted in illustration 320B of FIG. 3 is a stone floor consistent with a dungeon theme of the depicted virtual environment. In another example, the virtual navigable area depicted in illustration 330B of FIG. 3 is a molten-rock tiled floor consistent with a volcanic theme of the rendered virtual environment.

The VR world rendering component 740 can further include an obstruction selecting component 770 that can receive a piece of environmental sensor data (e.g., a depth map frame) and determine that a portion of the surrounding physical environment (i.e., the physical area captured by the depth map frame) corresponds to a physical obstruction, or in other words, a physical object detected within the navigable area. In some embodiments, the obstruction selecting component 770 can receive a piece of environmental sensor data (e.g., depth map frame) via environment sensing component 730 and determine that at least a portion of the received piece of environmental sensor data corresponds to a physical object, or in other words, a physical structure that is higher than the navigable area. In some aspects, the obstruction selecting component 770 can determine that a portion of the received piece of environmental sensor data corresponds to a physical obstruction based on the portion having a determinable depth or relative distance, or having a determinable difference in height from a flat planar ground or other determined surface or area on which the user can roam. In some embodiments, the obstruction selecting component 770 can select one or more virtual objects from a plurality of stored virtual objects to represent the detected physical obstruction. In some aspects, the one or more virtual objects are each selected based on a theme that is consistent (i.e., common) with a theme of the virtual environment.

In some embodiments, the obstruction selecting component 770 can select the one or more virtual objects based further on one or more determined characteristics of the corresponding physical obstruction, such as a determined relative distance, a determined height, width, depth, color(s), shape, motion or movement, velocity, or other determinable visual aspects thereof.

By way of a non-limiting example, looking back at FIGS. 320A-320B, the physical obstruction (e.g., person) depicted in illustration 320A of FIG. 3 is still (i.e., not moving), but may be located within a defined threshold distance from the HMD. As such, obstruction selecting component 770 can determine that the physical object is within the threshold distance based on a received first piece of environmental data. The obstruction selecting component 770 can further determine that the physical object not moving (or moving) relative to the HMD based on the received first piece of environmental data and at least another piece of environmental sensor data received sequentially after the received first piece. Based on determining that a position and/or distance of the physical object is not moving and is within the threshold distance, the obstruction selecting component 770 can select a thematically consistent virtual object or other rising mechanism that represents the physical object, such as the spikes rising from the ground in illustration 320B.

In some embodiments, the determined characteristic(s) of a physical object can be employed by the obstruction selecting component 770 to identify a type or category of virtual object that can be suitable to represent the detected physical object. Based on an identified type or category, a plurality of selectable virtual objects can be narrowed for more relevant representation. By way of non-limiting example, a type or category of virtual object can include a dynamic or "moving" virtual object (e.g., a pedestrian, animal, vehicle, robot), a static virtual object (e.g., a plant, furniture, standing water), a rising mechanism (e.g., spikes arising from floor, tiles floating upwards), or a falling mechanism (e.g., spikes retracting into floor, tiles sinking downwards), among other things.

The VR world rendering component 740 can further include an obstruction rendering component 780 that can generate (or render) a virtual object that corresponds to the physical object detected by obstruction selecting component 770. In some embodiments, the obstruction rendering component 780 can modify a generated virtual environment by inserting a virtual object, such as one selected by obstruction selecting component 770, into the generated virtual environment. The obstruction rendering component 780 can position and reposition the virtual object within the virtual environment to correspond to the position of the physical object within the physical environment.

In some embodiments, the obstruction rendering component 780 can track movements of the detected physical object based on determined changes of the physical object's relative distance or position. As noted herein, such changes can be determined based on a detected physical object's relative distance or position depicted in a sequentially received set of environmental data pieces. To this end, the obstruction rendering component 780 can move, reposition and/or resize the virtual object within the virtual environment based on corresponding movements or detected perceptual changes (e.g., enlarged appearance when closer, shrunken appearance when further) of the physical object in the physical environment.

In various embodiments, the VR roam tracking device 710 can include a stereoscopic displaying component 790 that can facilitate the stereoscopic displaying of a virtual environment and/or virtual object generated by VR world rendering component 740. As the HMD to which the VR roam tracking device 710 is coupled can stereoscopically display a virtual environment and/or virtual object, the stereoscopic displaying component 790 can be employed by any one or more components of VR roam tracking device 710 to rotate, offset, reposition, or otherwise adjust a virtual environment and/or virtual object to be displayed stereoscopically for viewing by a user.

Figure 8:
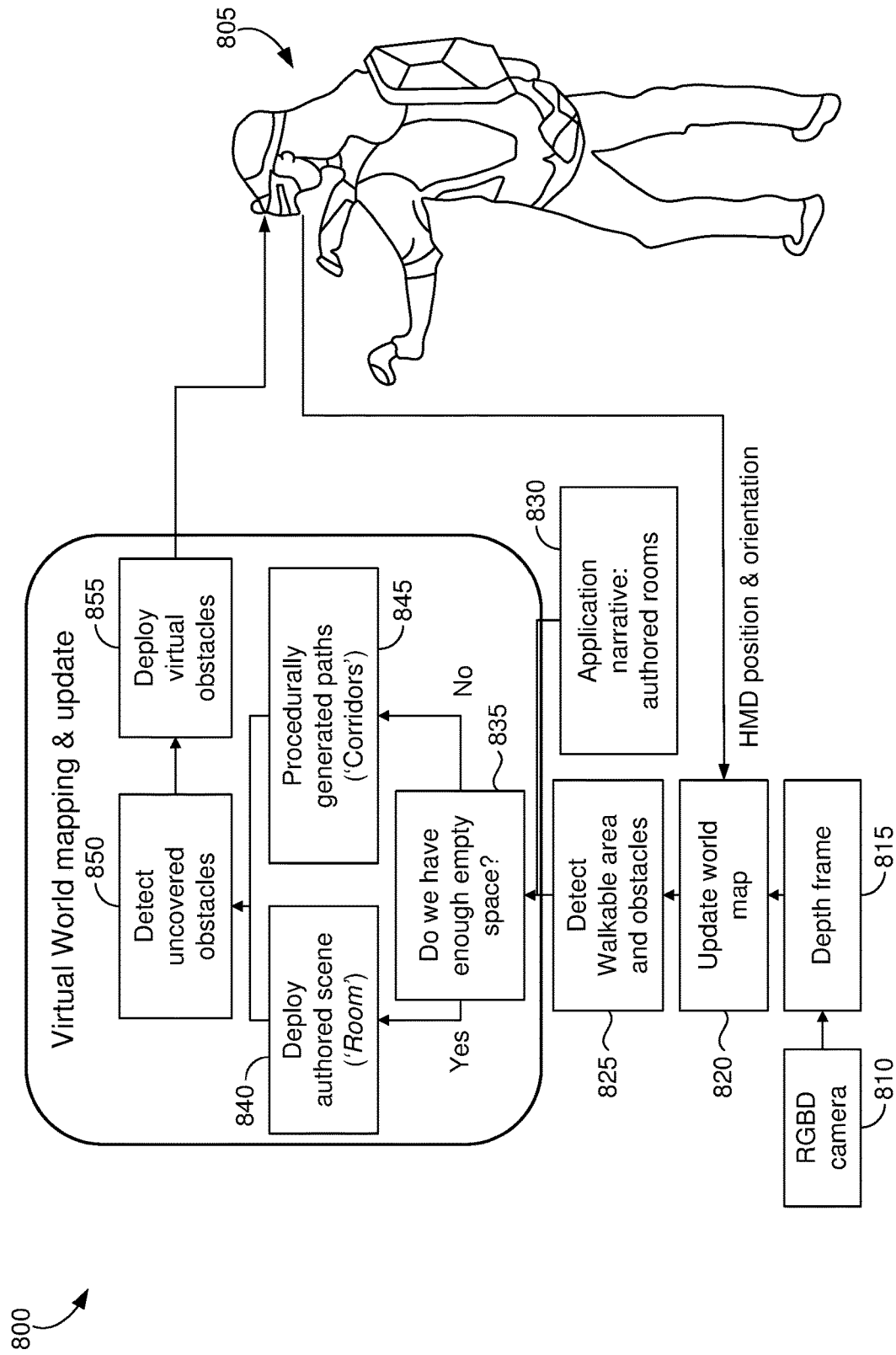
FIG. 8 is a flow chart depicting an exemplary process flow for rendering and updating a virtual environment and/or virtual objects on-the-fly based on sensor data, in accordance with some embodiments of the present disclosure.

Looking now to FIG. 8, a flow chart 800 is provided, depicting an exemplary process flow for dynamically rendering and updating a fully-immersive virtual environment in real-time based on received sensor data, in accordance with some embodiments. Depicted adjacent to the flow chart 800 is a user 805 wearing a HMD (e.g., HMD 610 of FIG.

6) and a backpack PC comprising a VR roam tracking device (e.g., VR roam tracking device 710 of FIG. 7), while walking in an unknown physical environment. A depth camera or RGBD camera 810 is attached to the HMD and transmits all depth frames 815 to the VR roam tracking device, where the VR roam tracking device processes them to update 820 the virtual environment experienced by the user 805. In accordance with various embodiments, and in contrast to many simultaneous localization and mapping (SLAM) systems, a physically-surrounding environment ("world") map of the user's physical surroundings does not assume temporal consistency, overriding prior knowledge with newer captures (e.g., received pieces of environmental sensor data).

As described herein, and in accordance with some embodiments, the VR roam tracking device can detect 825 areas of the physical environment that are either navigable areas or physical obstructions that may interfere with the user's path of travel. a flat planar ground can be assumed, and a VR roam tracking device (e.g., VR roam tracking device 710 of FIG. 7) can determine that a visible portion of the ground is a navigable area (i.e., a physical area on which a user can physically roam) based on one or more pieces of environmental sensor data received from a set of environmental sensors, such as environmental sensor(s) 620b of FIGS. 6-7. Also described in accordance with some embodiments, the VR roam tracking device can classify as a physical obstacle any detected physical object having a height above or below the detected floor (or determined navigable area) or a defined threshold height. The VR roam tracking device can store a dynamic two-dimensional (2D) map of the world representing both the determined navigable area and the physical obstacle(s). In some aspects, the VR roam tracking device can determine that any other location (e.g., not classified as a navigable area of physical object) is unknown.

In some embodiments, a VR application narrative can dictate 830 the need to display certain information to the user 805 wearing the HMD in a certain order. For example, in an adventure game, the user may see several scenes where they can collect resources, solve puzzles, or battle adversaries to gain access to others, and so on. A training application can require the user to execute certain tasks and expose the user to different scenarios. Each "scene," which can be defined as a "room" may require some physical resources to be deployed. A room may be as small as a size of an object to be picked up or as large as an authored space. In accordance with some embodiments, the "size" of a scene can correspond to the area that needs to be physically reached by the user, otherwise the virtual environment could be as large as desired. If the user can sense an empty space that is big enough to contain a scene, the VR roam tracking device in accordance with some embodiments can map the scene to that space.

In some embodiments, the VR roam tracking device can determine 835 whether enough physical space is available to deploy an authored scene (e.g., a virtual room) or a path (e.g., a virtual corridor). In some embodiments, if VR roam tracking device determines 840 that there is sufficient physical space available, a virtual room mapped to the physical space can be deployed 840 (e.g., generated and provided for display to the HMD). More so, if VR roam tracking device determines that there is no available physical space (e.g., no navigable area), the user may need to physically move (i.e., roam) to another part of the physical environment where a suitable space is found. The VR roam tracking device can detect possible target walkable directions for the user to explore and generate 845 procedural "paths" (e.g., virtual corridors) toward those targets that avoid a detected physical obstruction while, in some embodiments, obfuscating the physical obstruction's physical geometry. In this way, a generated procedural path can influence the user's 805 path of traversal to avoid the detected physical obstruction. In some embodiments, a generated procedural path can take a form of a winding corridor, a walk in a forest, or any environment that may fit the narrative (i.e., be thematically consistent with its virtual environment).

Beyond authored rooms and themed corridors, a generated virtual environment can include a set of virtual objects that may be positioned and moved by the VR roam tracking device to prevent the user from approaching a physical obstacle based on a detection 850 thereof. Once the local mapping of the virtual environment is set, the VR roam tracking device can modify the virtual environment by inserting a set of virtual objects 855 corresponding to the detected physical obstacle to complete the virtual environment. In various embodiments, the VR roam tracking device can display the virtual environment to the user 805 via the HMD from the user's 805 point of view, updating the virtual environment based on one or more new pieces of environmental sensor data received from the set of environmental sensors. The VR roam tracking device can update the virtual environment on-the-fly based on each new piece of environmental sensor data, such as a new depth frame 815 received from a depth sensor or RGBD camera 810.

Figure 9:
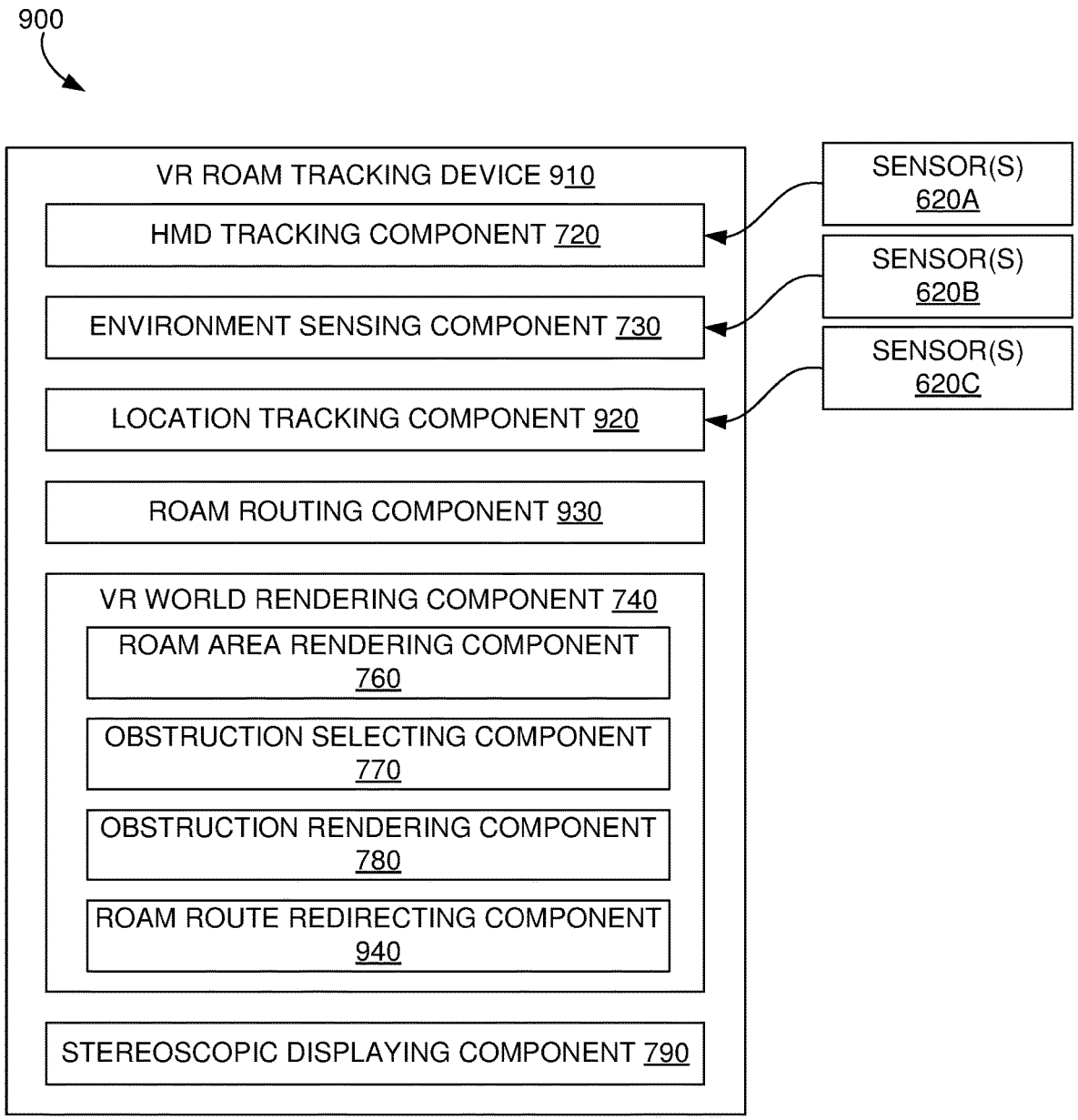
FIG. 9 is a block diagram of another exemplary VR roam tracking device for rendering and updating a virtual environment and/or virtual objects on-the-fly based on sensor data, in accordance with some embodiments of the present disclosure.

Turning now to FIG. 9, a block diagram 900 is provided, illustrating another embodiment of an exemplary VR roam tracking device 910, such as VR roam tracking device 615 of FIG. 6, for dynamically rendering and updating a fully-immersive virtual environment in real-time based on received sensor data. A VR roam tracking device 910 provided in accordance with some embodiments, in an example, can safely guide real-world roaming within an unfamiliar (e.g., not pre-scanned or modeled) or dynamic physical environment. The VR roam tracking device 910 can further facilitate safely-guided real-world roaming in an outdoor environment, such as a city street or other geographic area. In a preferred embodiment, the outdoor environment is one that can be depicted in an electronic map (e.g., a bird's eye map or three-dimensional map), and corresponds to a physical area that the VR roam tracking device 910 can determine its precise location (e.g., via determined location data). It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The VR roam tracking device 910 is an example of a suitable architecture for implementing certain aspects of the present disclosure. It should be understood that any number of user devices, hardware, modules, or components within the scope of the present disclosure can be employed to perform the functions described in associated with the VR roam tracking device 910. In some embodiments, the VR roam tracking device 910 can include a computing device, such as the computing device 1500 described in relation to FIG. 15 herein. As each of the described components are depicted as being included in the VR roam tracking device 910, it is contemplated that any component depicted therein is not limited to the illustrated embodiment, and can be distributed among a plurality of computing devices, modules, or hardware devices, or in some instances, may be conflated into a single hardware device or module, such as a processor or hardware device. It is also contemplated that any one or more of the described components can be completely removed from the VR roam tracking device 910, so long as one or more operations described in correspondence to a removed component can be compensated for by one or more other components, or a third-party resource, remote computing device, or hardware device, among other things.

Like the VR roam tracking device 710 of FIG. 7, the VR roam tracking device 910 can be coupled to head-mounted display (HMD), such as HMD 610 of FIG. 6. The VR roam tracking device 910 can also be coupled to a set of sensors, such as tracking sensor(s) 620a and environmental sensor(s) 620b. In various embodiments, the set of sensors can further include a set of location sensor(s), such as location sensors 620c of FIG. 6. As briefly described in relation to FIG. 6, any one or more of the tracking sensor(s) 620a, environmental sensor(s) 620b, and/or location sensor(s) 620c can be integrated into or rigidly secured to the HMD in accordance with some embodiments.

In addition to a HMD tracking component 720 and/or environment sensing component 730, each having been described in relation to FIG. 7, the VR roam tracking device 910 can further include a location tracking component 920. In some embodiments, the location tracking component 920 can receive physical location data from the set of location sensors, such as location sensors 620c of FIG. 6. In various embodiments, the location tracking component 920 can receive the physical location data from the set of location sensors 620c to determine, among other things, physical location coordinates of the sensor(s) (and thereby the user wearing the HMD 610), whether through receiving determined location coordinates (e.g., GPS coordinates) or by triangulating an approximate location based on received source signals, among other things. In some embodiments, the location tracking component 920 can triangulate the approximate location utilizing signal characteristics, known location coordinates of signal sources, or by communicating with a third-party service (e.g., server device 640) via a network, such as network 630 of FIG. 6.

In some further embodiments, the VR roam tracking device 910 can include a roam routing component 930 that can employ the determined location coordinates to, among other things, identify where the set of location sensors 620c (and thereby the user wearing the HMD) is physically located relative to static physical obstructions (e.g., buildings, streets, busy intersections, water) defined and/or depicted on an electronic map. More so, in some further embodiments, the roam routing component 930 can also determine where the user is physically located relative to defined and/or depicted navigable areas, such as sidewalks, crosswalks, pathways, and the like. In some embodiments, the roam routing component 930 can extract relevant mapping data (e.g., colors, metadata, dimensions) corresponding to defined static physical obstructions or navigable areas from the electronic map to determine the user's location relative thereto.

In various embodiments, the roam routing component 930 can generate a navigable route (e.g., a walkable pathway) from a determined current physical location to a selected destination (e.g., destination coordinates). In some aspects, the roam routing component 930 can generate a prompt that requests an input that corresponds to a desired destination. The user can provide the input (e.g., via speech, controller, eye tracking, motion tracking) to select the destination as a response to the generated prompt. In some other aspects, the roam routing component 930 can generate and present a set of potential destinations to which the user can provide the input to select the destination. Provided with the selected destination, the roam routing component 930 can determine a walkable route that directs the user from his/her current location to the selected destination. In some embodiments, the roam routing component 930 can employ an electronic map stored in a memory of the VR roam tracking device 910. In some other embodiments, the roam routing component 930 can send the determined current location and selected destination to a routing service, such as a map routing service hosted by server device 640 of FIG. 6. The roam routing component 930 can receive from the server device the walkable route. In various embodiments, and with brief reference to FIG. 10, the determined walkable route can include a series of GPS coordinates that define the walkable route 1010. In some embodiments, the roam routing component 930 can employ only the determined walkable route to direct the user to the selected destination.

Figure 10:
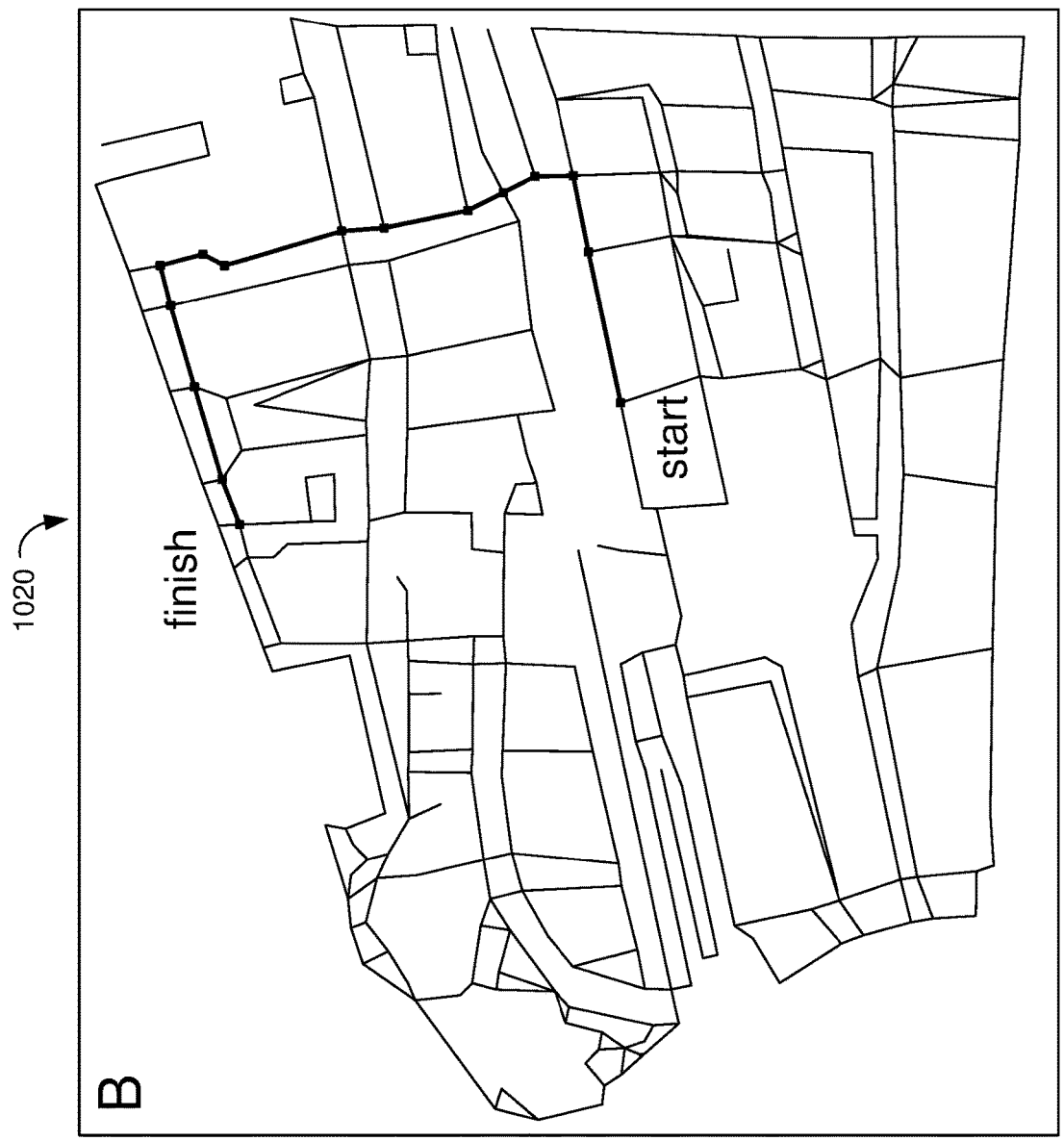
FIG. 10 depicts a variety of illustrations showing a determined walkable route and a selected virtual path, in accordance with some embodiments of the present disclosure.
Figure 10:
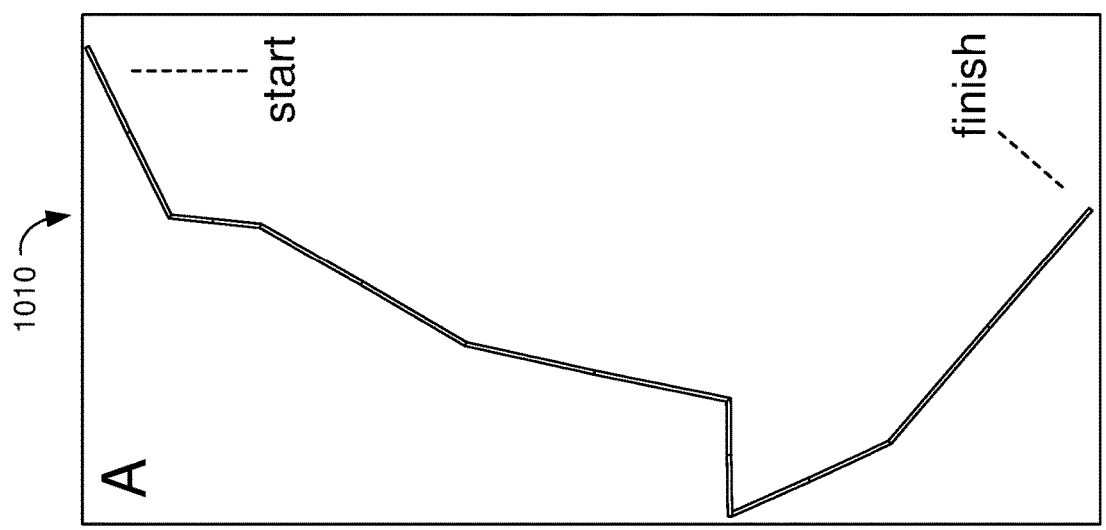

In some other embodiments, and again with brief reference to FIG. 10, the roam routing component 930 can attempt to match the determined walkable route to a virtual path 1020 of a plurality of potential virtual paths included in one of a set of defined virtual worlds stored in a memory of the VR roam tracking device 910. In this regard, the roam routing component 930 can employ a variety of parameters to compute a quality or similarity of a virtual path for mapping to the determined walkable route. In some aspects, if variations between a selected virtual path and determined walkable route are identified, a roam route redirecting component 940 can be employed to effectively redirect the user at identified variable points throughout the determined walkable route.

By way of example, the roam route redirecting component 940 can compare a length scale of a virtual path and the determined walkable route. In some aspects, the length of the virtual path should not exceed the actual distance by more than a threshold distance or percentage (e.g., 33%). In a preferred embodiment, the cost of matching a determined walkable route segment is 0 if it maps to a virtual path segment within this acceptable length scale; otherwise, its cost is the change in length beyond this amount, normalized by the length of the segment. In this regard, the roam route redirecting component 940 can calculate the total cost of the path (length_cost) as the sum of the squares of all segments costs.

In another example, while a virtual path and the determined walkable route might have variations in shape (e.g., to avoid physical obstructions), the local difference between the two should not exceed the street or a road. The cost per segment can thus be defined as the maximum distance between the linear segment mapped to the virtual world and the matching virtual path. In this regard, the roam route redirecting component 940 can calculate the total cost of these differences (length_cost) as the sum of the squares of each segment match cost.

In yet another example, while the global shape of the virtual path and the determined walkable route may differ, it is preferred that changes in curvature along the path should not exceed 45 degrees at any point. Beyond this angle, redirection can become obvious to the user and instead be substituted by scripted distractions. In a preferred embodiment, one goal of the roam route redirecting component 940 is to keep the number of redirections (dir_cost) to a minimum.

In some embodiments, the roam route redirecting component 940 can calculate a quality rating on a convolution of these three factors (e.g., length scale, difference, redirection) and define the quality as:

$$\text{match}_{cost} = (w_{len} * \text{length}_{cost}^2 + w_{lin} * \text{diff}_{cost}^2 + w_{dir} * \text{dir\_cost}^2)^{1/2}$$

where $w_{len}$, $w_{lin}$, $w_{dir}$ are employed as factors to balance between the constraints. In some further embodiments, the roam route redirecting component 940 can include a more elaborate planning procedure, incorporating additional factors such as differences in inclination, a fit of passive haptics (e.g., buildings), or audio sources detected in the real world or physical environment.

To find and fit a virtual path "Q" to the given real-world path (i.e., determined walkable route) "P," roam route redirecting component 940 can execute a greedy search for candidate virtual paths. At each iteration, the roam route redirecting component 940 can generate a plausible mapping of each of the path vertices $P_i$ to a matching vertex $V_i$ in the graph, where the distance between $[V_i, V_i+1]$ is determined within the length scale of the corresponding determined walkable route segment.

Once a suitable mapping between a virtual path and determined walkable route is obtained, the VR roam tracking device 910 can begin generating a virtual environment with virtual objects along a virtual path. Similar to the VR roam tracking device 710 of FIG. 7, the VR roam tracking device 910 can include a roam area rendering component 760 to generate virtual representations of determined navigable areas (e.g., determined walkable routes) and/or physical obstructions. In addition to some of the features described in reference to roam area rendering component 760 of FIG. 7, the roam area rendering component 760 of FIG. 9 can also generate and insert virtual objects that represent static physical obstructions identified from the electronic map by roam routing component 930. In some embodiments, the virtual objects representing identified static physical obstructions can include virtual buildings, virtual road blocks, virtual trucks, virtual food carts, or virtual poster stands, among other virtual objects representative of non-moving or non-animated objects. The VR roam tracking device 910 can employ an obstruction selecting component 770, as described in reference to FIG. 7, to select a static virtual object to graphically represent an identified static physical obstruction. In some aspects, and particularly for virtual environments representing an outdoor virtual world, additional static (non-moving) and/or dynamic (e.g., moving) virtual objects can be selected and inserted into the virtual environment by obstruction rendering component 780, positioned within the virtual environment corresponding to determined non-navigable areas or detected physical obstructions.

As noted herein, the VR roam tracking device 910 can include a HMD tracking component 720, an environment sensing component 730, a VR world rendering component 740, a roam area rendering component 760, an obstruction selecting component 770, an obstruction rendering component 780, and a stereoscopic displaying component 790, as described in relation to FIG. 7. It is contemplated that any or all features described with respect to the foregoing components of VR roam tracking device 710 of FIG. 7 can be included in the VR roam tracking device 910 of FIG. 9, as depicted.

Figure 11:
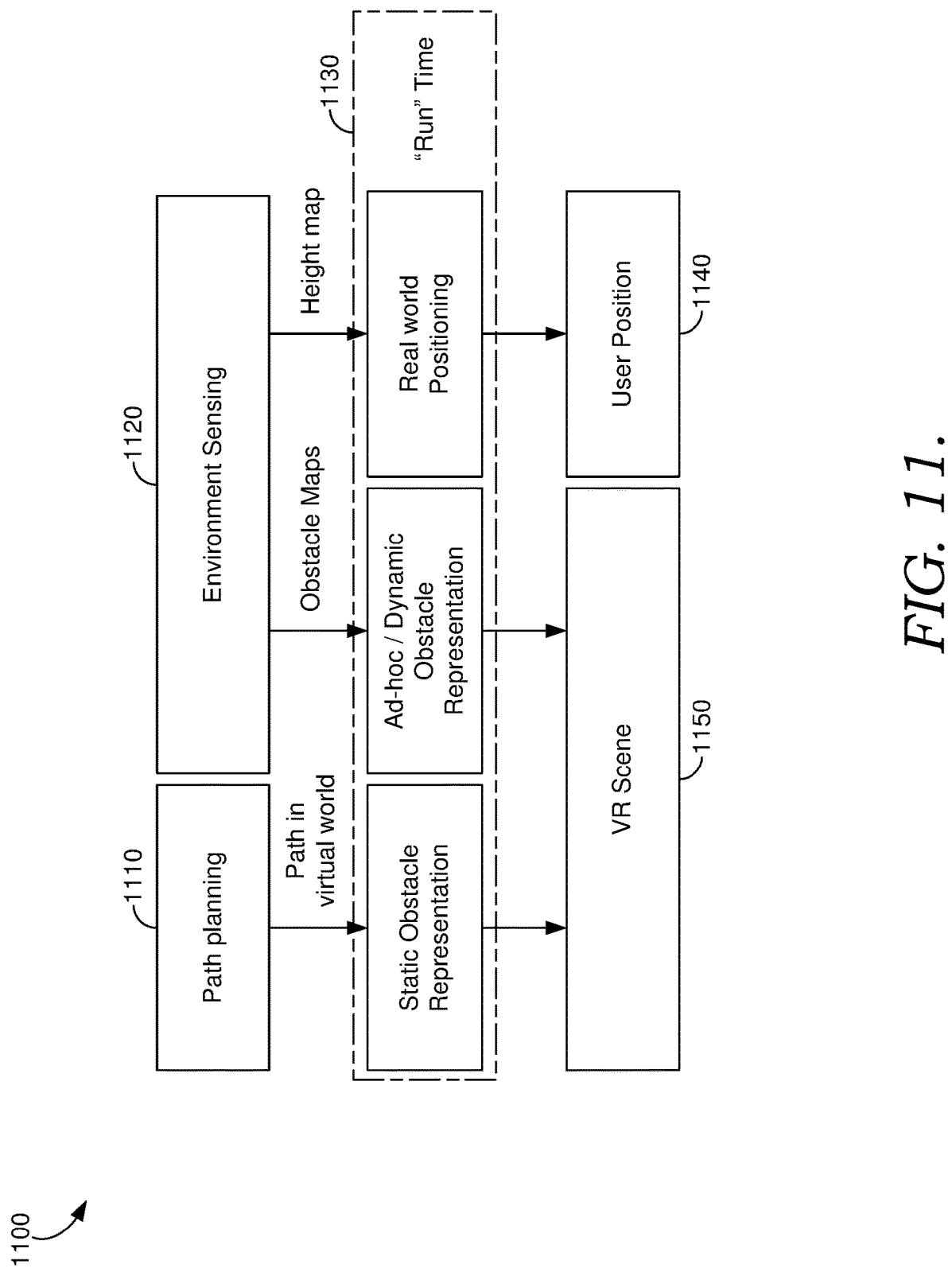
FIG. 11 is a flow chart depicting another exemplary process flow for rendering and updating a virtual environment and/or virtual objects on-the-fly based on sensor data, in accordance with some embodiments of the present disclosure.

Looking now to FIG. 11, a flow chart 1100 is provided, depicting an exemplary process flow for dynamically rendering and updating a fully-immersive virtual environment in real-time based on sensor data received in an outdoor physical environment, in accordance with some embodiments. A VR roam tracking device, such as VR roam tracking device 910 of FIG. 9, provides a tracking and navigation system that guides users of a HMD coupled to the VR roam tracking device through virtual environments utilizing real-world movements (e.g., walking) while safely redirecting the user through the physical environment to reach a selected target destination. Various components of the VR roam tracking device, as described in reference to FIG. 9, can provide at least a path planning sub-system 1110, a real-time environment sensing sub-system 1120, and a runtime sub-system 1130 of the VR roam tracking device. It is contemplated that the VR roam tracking device, such as VR roam tracking device 910 of FIG. 9, is not intended to be limiting, and that the sub-systems described herein are provided such that any of the components referenced in FIG. 9, or otherwise not described with reference to FIG. 9 but described below, can be employed to perform the features of a VR roam tracking device in accordance with some embodiments of the present disclosure.

The input for path planning sub-system 1110 is a given real-world path, such as a determined walkable route. In some aspects, the determined walkable route can correspond to a walkable route a user takes every day, or just the path to his/her next destination. Additional input is the virtual world where the user will be walking in. To assure that the user will be safe, a goal of the VR roam tracking device is to ensure the user travels only in navigable areas (i.e., free from physical obstructions).

To keep the virtual experience believable and immersive, in preferred embodiments, the path the user is taking should also be feasible in the virtual world. The VR roam tracking device in accordance with various embodiments described herein is designed to let the user enjoy generic VR content, not specially generated for use with a specific physical location (i.e., a known or pre-scanned environment). As such, the first task for the path planning sub-system 1110 is to find a virtual path in the VR world (e.g., a defined virtual world or map) that matches as closely as possible the "real" path, or in other words, the determined walkable route. Any differences between the real and virtual paths can be resolved by redirection and slight variation of the user's virtual walking speed. The path planning sub-system 1110 can identify possible locations where these corrections may be applied and populates the virtual world with static objects that can prevent the user from hitting physical obstacles identified beforehand from mapping data (e.g., buildings, streets).

Real-time environment sensing sub-system 1120 and the runtime sub-system 1130 operate at runtime to guide the user along a real-world path that leads the user to the selected target destination, while safeguarding the user from detected physical obstacles. To do so, the VR roam tracking device can employ a set of sensors that collect sensor data in real-time. In some embodiments, the set of sensors can include a set of tracking sensors (e.g., 6-DOF inside-out tracker), a set of location sensors (e.g., GPS sensor), and/or a set of environmental sensors (e.g., RGB depth cameras), among other things.

In various embodiments, the set of location sensors can be employed to determine a real-world location (e.g., coordinates), while the set of tracking and/or environmental sensors can be employed to produce a relative position trace. The VR roam tracking device can employ the set of environmental sensors to obtain real-time information about the user's immediate surroundings and obstacles. The VR roam tracking device can fuse the sensor data received from all sources (e.g., tracking, location, and/or environmental sensors) to estimate the user's precise real-world location 1140 and redirect them in the virtual world to stay on the planned path. A virtual reality environment or scene 1150, including virtual objects, can be generated and dynamically updated to visually represent detected obstacles in the real-world, creating a lively virtual environment for the user to experience.

Figure 12:
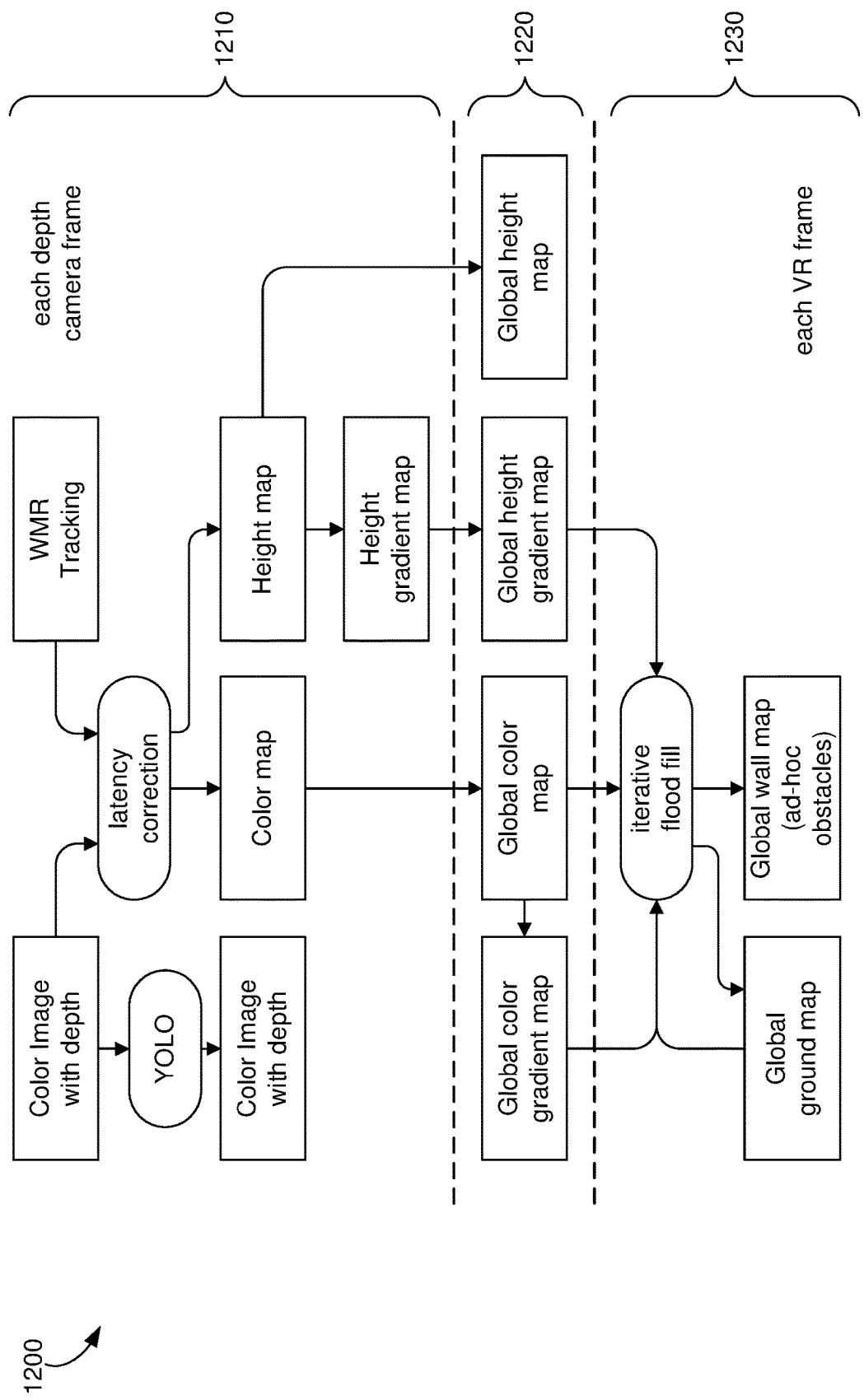
FIG. 12 is a flow chart depicting an exemplary process flow of a real-time environment sensing sub-system, in accordance with some embodiments of the present disclosure.

Looking now to FIG. 12, a flow chart 1200 is provided, depicting an exemplary process flow of a real-time environment sensing sub-system of a VR roam tracking device, such as the real-time environment sensing sub-system 1120 of FIG. 11, in accordance with some embodiments. In some embodiments, the real-time environment sensing sub-system can generate two signals for a runtime sub-system (e.g., runtime sub-system 1130 of FIG. 11) of the VR roam tracking device. The signals can include a height map 1210 and a path map 1220 (i.e., walkable paths), as well as a global wall map 1230 that can include the locations of identified static physical obstacles and/or other detected physical obstacles, any of which can be obtained and utilized as input to the runtime sub-system. In some embodiments, a depth stream (e.g., a set of depth map frames or images and/or a set of RGB maps or images) can be received from a set of environmental sensors, such that the VR roam tracking device can align them accordingly.

In accordance with some embodiments, by processing the RGB depth stream, the VR roam tracking device can detect two types of non-walkable areas, both of which can qualify as "ad-hoc" or detected physical obstacles. First, some non-walkable areas (e.g., benches, pillars, walls) can preclude walking simply by physically obstructing a determined navigable area or walkable route, and thus can be determined to have a distinct height difference compared to the surrounding ground. Second, other non-walkable areas (e.g., grass patches, dirt roads, or sidewalk strips) can have a similar height as the surrounding ground, but can be determined to differ in texture and color as the surrounding ground.

To detect and track non-walkable areas, the VR roam tracking device can construct a height map from the depth image or frame upon receipt thereof. Each RGB depth frame can be projected from the set of environmental sensors into a tracking space in the form of point clouds. These points can then be projected onto a ground plane, which can result in the generation of a height map and a color map. The VR roam tracking device can down-sample these projections to height and color images. In some aspects, one pixel corresponds to 10 cm×10 cm and 5 cm×5 cm, respectively, for the purpose of reducing memory consumption and mitigating computational delays. In some embodiments, a set of shaders for the projections can be employed to produce color maps and two depth maps.

To obtain a nearly-complete color map, the VR roam tracking device can render triangles constructed from adjacent pixels. For the height maps, the VR roam tracking device can extract the highest and the lowest point in the point cloud within the region of this pixel and produce a projection of highest and lowest points, respectively. The VR roam tracking device can then define the gradient of a pixel as the maximum difference between the highest point and the lowest point for each pixel as well as adjacent pixels, resulting in the generation of a height gradient map. The VR roam tracking device can perform this process independently for each RGB depth frame, each of which is inherently noisy and thus not suitable to directly generate virtual objects representative of physical objects. Once the VR roam tracking device obtains a color map, height map, and height gradient map, it can align consecutive maps utilizing tracking and temporal filtering, among other things. The VR roam tracking device can, as a result, derive the global color gradient map from the global color map.

The VR roam tracking device can then generate the path map (i.e., the map of walkable paths) and the wall map, which encodes the locations where the runtime sub-system of VR roam tracking device must position virtual obstacles within a virtual environment. The accuracy of the wall map can be crucial for creating a compelling and safe virtual environment for the user. As such, the VR roam tracking device extracts real-world obstacles from the global height gradient map, and not the global height map itself. The global height map can be prone to misalignments due to small inaccuracies in pitch, which can generate large height gaps in between the aligned local height map and existing global height map. For example, one-degree of misalignment can result in a height difference of 4 inches just 15 feet away—a sizable obstacle that would result in a false-positive VR representation. The global height gradient map is less prone to this error because when computing this map, the VR roam tracking device only compare heights within a local height map and only use the difference in fusing them.

In accordance with various embodiments, the VR roam tracking device's extraction of virtual representations based on the global height gradient map and thus extracting them from the edges of real-world obstacles can be sufficient for safe navigation. This is because large areas of non-walkable obstacles require a representation in VR solely in locations closest to the user—those that the user would risk walking into. The VR roam tracking device can generate the path map from the global height gradient map through a flood fill starting at the user's location and only filling in areas where the color and height gradients are below a defined threshold. Because flood fill is unsuitable for parallelization, the VR roam tracking device leverages the fact that the global gradient map remains relatively consistent over time, because all ad-hoc physical objects are stationary in the real world. Thus, the VR roam tracking device performs an iterative flood fill, which can advance the previous flood fill for 4 pixels per RGB depth update. Whenever the flood fill cannot fill into an area, the VR roam tracking device can mark that pixel as an obstacle in the wall map.

Next, the VR roam tracking device can classify contiguous regions of colored areas in this synthetic RGB image based on predefined RGB distributions, such as green or red, as such areas tend to demarcate, for instance, sidewalks from other parts of the pavement. For those areas that produce a sufficient score during the matching, the VR roam tracking device can additionally mark them as non-walkable in the path map.

To detect dynamic physical objects, the VR roam tracking device processes both RGB images for people and other moving physical objects. The VR roam tracking device can integrate YOLO real-time object classification into a separate thread, which can report 2D boxes of detected objects (e.g., at 15 Hz). By projecting them into the environment using the closest distance within a 10×10 pixel area in the depth images and inside-out tracking, the VR roam tracking device can register their locations within the wall map and report them to the runtime sub-system. This can ensure that the obstacle representation is positioned in the virtual environment closer to the user, to effectively warn the user about the detected physical obstruction.

With reference back to FIG. 10, the runtime sub-system 1130 of a VR roam tracking device, such as a VR roam tracking device 910 of FIG. 9, can execute three primary tasks in accordance with some embodiments. The tasks can include: positioning—for determining the user's accurate position in the real world; redirecting—to compensate for drift between virtual world and real-world tracking by applying additional redirection according to the planned path; and obstacle representation—producing virtual objects to safely guide the user in a natural way.

The task of positioning by runtime sub-system 1130 is to produce a rigid transform T that maps locations and orientations from the inside-out tracking space $T_{origin}$ real-world coordinates $T_{gps}$. A focus of the task is to provide horizontal correction of the user's position (i.e., the X-Z axes in Unity coordinates or latitude-longitude in GPS coordinates). The runtime sub-system 1130 can receive two types of input: user's position $p_{user/gps}$, in real-world GPS coordinates $T_{gps}$ and inside-out tracking data with relative locations. In contrast to GPS' coarse but globally grounded measurements, inside-out tracking data can measure differential changes of positions and orientations. Its current orientation $T_{user/origin}$ can correspond to an accumulation of transformations from an arbitrary initial coordinate system at the beginning of the path, $T_{origin}$, to the current coordinate system around the user $T_{user}$. As time progress, accumulated error may generate a drift of $T_{user}$ relative to the global coordinate system.

While one naïve solution is to fit a rigid transformation between a history of recent GPS locations and corresponding user locations, in practice, the GPS positions $p_{user/gps}$ collected by VR roam tracking device have systematic offsets from the user's true position due to multi-path effects, atmospheric effects, and the like. For example, when walking along buildings in the real world, the received GPS coordinates can have a constant offset either towards a street or a location inside a building. The resulting transformation could create a path outside of the true walkable area and thus would not be safe for real-walking. To derive an accurate transformation during runtime, the runtime sub-system 1130 operates under an assumption that the user is always walking on the planned path. This can allow the runtime sub-system 1130 to transform the inside-out tracking data history $[p_{user/origin}]$ utilizing the estimated transform of the aforementioned naïve method to derive $[p'_{user/gps}]$. The runtime sub-system 1130 then accurately aligns the result with the part of the planned path $[p_{path}]$ that the user has already walked ($p'_{user/gps}$) utilizing an iterative closest point matching algorithm. This alignment can produce a correction matrix $T_{history}$, mapping the estimated GPS transformation to a more accurate GPS transformation. This target rigid transform is denoted herein as $T_2=T_1*T_{history}$.

While $T_2$ can accurately map locations across the user's path, inaccuracies can still occur along the path, and thus in a direction that most likely contains physical obstacles next to the user, such as buildings. Such behavior could occur after walking a long and straight path segment, for example, just before turning right at an intersection in the real world. Since $T_{history}$ transforms the user's location history to the already walked path, it only corrects inaccuracies perpendicular to the user's walking direction. When reaching a turn on the planned path, for example at an intersection, the runtime sub-system 1130 cannot accurately determine where and when the user should make this turn using only this transformation, because locations parallel to the current walking direction can be inaccurate. The runtime sub-system 1130 thus complements its previous transformations with another correction matrix $T_3$, which is generated based on the generated global height map described in reference to FIG. 12. The user's future path is projected onto the generated height map and a search is initiated for the best fit in the possible transformation space of $[T_2^{-1}=T_{future}]$ across offsets in the two horizontal dimensions as well as rotation offsets. Utilizing a compute shader, the runtime sub-system 1130 can determine the total height changes along each one of these possible paths. Given a path originated from the path planning subsystem, such as a determined walkable route, the runtime sub-system 1130 can determine that it traverses the real-world across a flat ground, meaning a low total change in heights during the search. The runtime sub-system 1130 thus selects the transform $T_{future} \in [T_{future}]$ with the lowest total height change, and apply this correction to the original transform $T_2$. As a result of this correction, the runtime sub-system 1130 can obtain an accurate transformation that compensates for inaccuracies and jumps in both dimensions of the GPS updates: $T_3=T_{future}^{-1}*T_2$. The variable $T_3$ is referenced hereinafter to correspond to the transform that accurately maps coordinates from the inside-out tracking space $T_{origin}$ to the GPS space $T_{gps}$.

On the other hand, the task of redirecting by runtime sub-system 1130 is to track the user's position in two reference systems: where the user is physically located (as reported by the positioning task of runtime sub-system 1130), and the location in the virtual world. While the user traverses both reference systems through walking, the runtime sub-system 1130 can ensure that the visuals presented to the user result in their accurate and safe walking in the real world. In the case of a discrepancy between both reference systems, the runtime sub-system 1130 can apply a gradual correction of the VR rendering to implicitly redirect the user's walk without their noticing.

The task of redirecting by runtime sub-system 1130 can implement redirected walking by limiting transformation changes according to the user's actual viewport motion. The transformation matrix T derived above can include large differences frame to frame and may even change when the user performs no motion, because of inaccurate GPS updates. Resulting changes in the visual experience may thus be confusing or discomforting to the user.

In each frame $f_n$, the runtime sub-system 1130 can record the current transform $T_{current}[n]$, as well as the user's transform $T_{user/origin}[n]$ from the inside-out tracking origin. In each following frame $f_{n+1}$, the runtime sub-system 1130 can obtain the ideal transform $T[n+1]$ from the positioning task of runtime sub-system 1130 as well as the user's new transform from the $T_{user/origin}[n+1]$. The runtime sub-system 1130 can determine how much the user moves T origin frame-to-frame in the GPS space $M_{expected}[n+1]=T_{user/origin}[n+1]*T_{current}[n]-T_{user/origin}[n]*T_{current}[n]$. The amount of this actual motion can correspond to the visual changes the runtime sub-system 1130 produces to satisfy the user's expectations. If the runtime sub-system 1130 now directly applied the transform from the positioning task, the user's transform would amount to $T_{user/origin}[n+1]*T_{n+1}$ and thus a (visual) movement of $M_{target}[n+1]=T_{user/origin}[n+1]*T_{user/origin}[n]*T_{current}[n]$. Assuming that the transform $T_{current}[n+1]$ results from this frame, the movement the user can experience in response to this frame amounts to $M_{actual}[n+1]=T_{user/origin}[n+1]*T_{current}[n+1]-T_{user/origin}[n]*T_{current}[n]$.

In a preferred embodiment, the actual movement $M_{actual}[n+1]$ is preferably within the human detection threshold of the expected movement $M_{expected}[n+1]$ while remaining as close as possible to target movement $M_{target}[n+1]$. Therefore, in some embodiments, the runtime sub-system 1130 can generate the range of movements that are acceptable around the expected movement $M_{expected}[n+1]$ and scale the target movement $M_{target}[n+1]$ back to be within that threshold. This can thus result in the actual movement $M_{actual}[n+1]$ following this frame. With this actual movement, the runtime sub-system 1130 can calculate the transform of this frame by reversing the movement equation:

$$T_{current}[n+1]=(T_{user/origin}[n+1])^{-1}*T_{user/origin}[n]*T_{current}[n]+*M_{target}[n+1].$$

In some embodiments, the runtime sub-system 1130 can generate the acceptable movement by allowing the movement to scale in the direction of the user's actual movement within an acceptable range (e.g., 0.78 and 1.22). Perpendicular to the user's motion, runtime sub-system 1130 can scale movements within a defined percentage (e.g., 2.2%) of the original motion. In some further embodiments, the runtime sub-system 1130 can scale rotations by a factor within another acceptable range (e.g., 0.9 and 1.68).

In accordance with some embodiments, the runtime sub-system 1130 can provide a smooth experience to the user while gradually redirecting them towards the more accurate position by employing the foregoing techniques.

In some further embodiments, the runtime sub-system 1130 can map the real-world position into the virtual world. By way of example, the runtime sub-system 1130 can utilize the corresponding control points in the real world and the virtual world that the runtime sub-system 1130 places during path planning (e.g., path planning sub-system 1110). Preferably, the runtime sub-system 1130 can match all intermediate locations during runtime for smooth redirection. One goal of the runtime sub-system 1130 is to generate a transform for every point in the real world, such that the closest control point in real world can map to a location in the virtual world with an ideally zero offset to the corresponding virtual control point. This entails that adjacent points in the real world retain their spatial neighborhood relationship in the virtual world. This transform also needs to produce continuous rotations offset across the electronic map, as the user may otherwise experience sudden change of position or rotation when walking. In some embodiments, the runtime sub-system 1130 can accomplish this goal based on feature-based image metamorphosis—transforming one set of positions to another set utilizing "line pairs" and linear interpolation. The runtime sub-system 1130 can extend this approach to utilize the more granular pairs of control points by connecting adjacent control points to line segments, and then matching series of them. The runtime sub-system 1130 can also incorporate the rotation transforms mentioned herein above into the matching of position pairs, treating rotation as an additional dimension and applying the same interpolation.

As the runtime sub-system 1130 has computed the user's position on the electronic map, the redirected viewport, and having detected physical objects around the user, the runtime sub-system 1130 can perform the task of obstacle representation. The runtime sub-system 1130 can fuse the foregoing computations to curate the user's VR experience. In some embodiments, and as briefly described herein, the runtime sub-system 1130 can populate the virtual world (i.e., virtual environment) with animated objects and/or characters to effectuate a sense of realism. As such, apart from such objects or characters, the runtime sub-system 1130 can introduce additional virtual objects that represent detected physical objects.

With regard to some static physical objects, the virtual environment can be populated with static obstacles based on determined map topography (e.g., detected buildings, roads), as described above at least in reference to path planning sub-system 1110. By routing a virtual path through the virtual environment that resembles the determined walkable route can enable the runtime sub-system 1130 to utilize virtual facades and street objects as virtual obstructions. In some instances, the determined walkable route cannot be perfectly routed through the virtual environment while staying within the constraints of tolerable redirection. Instead, the path planning sub-system 1110 can determine a virtual route that diagonally crosses a street—an action that is uncommon in the real world. As such, the runtime sub-system 1130 can account for such circumstances.

By way of some non-limiting examples, in the regular case of crossing at a virtual intersection within the virtual environment, the runtime sub-system 1130 can simply stop any virtual traffic (e.g., animated vehicles) to yield to pedestrians, optionally supplemented by traffic lights, among other things. In the case where virtual streets are to be crossed midway, the runtime sub-system 1130 can find a plausible solution of stopping the virtual traffic in the middle of the virtual street, such as by placing a virtual firetruck or virtual police block. If the path planning sub-system 1110 cannot produce a better path than a diagonal crossing, the runtime sub-system 1130 can shuts down the entire virtual road by populating the ends with virtual road blocks, thus preventing virtual traffic and allowing the user to "safely" cross the virtual street.

With regard to detected physical objects, whether ad-hoc or dynamic, the runtime sub-system 1130 can animate virtual characters (e.g., virtual pedestrians) to move into the corresponding location of such physical objects. In some aspects, the challenge of representing moving dynamic physical objects can be addressed By utilizing virtual pedestrians to deal with uncertainty in physical object detection, all while giving the virtual environment a lively feeling that blends in well or is thematically consistent with the virtual environment representative of a large city.

In some embodiments, animated virtual pedestrians inserted into the virtual world can complement the real-time environment sensing sub-system, such as real-time environment sensing sub-system 1120 of FIG. 11 of the VR roam tracking device. As the positioning task of runtime sub-system 1130 system can change T gradually, frame by frame according to the new data it receives, animated virtual pedestrians that are located utilizing the previous frame's transformation T can move to the now updated detected physical object locations to match the user's relative position. In addition, because of active walking redirection, the runtime sub-system 1130 cannot represent ad-hoc physical objects with static virtual objects, as their corresponding positions should also be updated. Otherwise, users can misjudge the distance and direction to virtual objects in a virtual environment due to the transformation scaling applied while walking.

In some embodiments, the runtime sub-system 1130 can consult the wall map and the location of dynamic physical objects detected or derived by the real-time environment sensing sub-system (e.g., real-time environment sensing sub-system 1120 of FIG. 11) to assign the target locations of animated virtual pedestrians. Because the wall map may potentially contain a large number of physical objects, the runtime sub-system 1130 can restrict the number of actively considered ad-hoc physical objects to a radius around the user. The runtime sub-system 1130 can further delete or reduce the number of animated virtual pedestrians, such that no two animated virtual pedestrians would share the same direction from the user's perspective. In some aspects, many of the ad-hoc physical objects marked in the wall map can share a similar location (e.g., along sidewalks). As such, the runtime sub-system 1130 can virtually represent them utilizing a sparse set of animated virtual pedestrians, giving each animated virtual pedestrian a "personal space" (e.g., 50 cm) that prevents the user from colliding with them.

In some embodiments, the runtime sub-system 1130 can make the appearance and disappearance of animated virtual pedestrians (or other virtual objects) in the virtual environment appear natural. The runtime sub-system 1130 can animate virtual pedestrians to walk towards their assigned target locations, as depicted in illustration 510B of FIG. 5. In this regard, the runtime sub-system 1130 can "draft" nearby virtual pedestrians to represent physical object, thus ideally keeping virtual pedestrians appear as if they are walking throughout the virtual environment for the impression of a lively virtual scene. Each virtual pedestrians can follow a principal direction, either walking the path in the direction the user will follow or walking against it (i.e., towards the user). In some embodiments, the walking speed (e.g., speed of movement) of virtual pedestrians (or other dynamic virtual objects) can thereby depend on the user's distance to them. While virtual pedestrians (or other dynamic virtual objects) can outpace the user to a detected physical object, some may never reach the target physical object if it is far enough away and the runtime sub-system 1130 determines that there is no risk (e.g., distance exceeds threshold distance) of the user approaching it.

In some embodiments, and to ensure reasonable behavior, the runtime sub-system 1130 can utilize the virtual pedestrians (or other dynamic virtual objects) that are visible within the virtual environment or scene. If the number of perceivable virtual pedestrians (or other dynamic virtual objects) is insufficient to represent all detected and/or determined physical objects, the runtime sub-system 1130 can spawn (e.g., generate) new virtual pedestrians (or other dynamic virtual objects) well outside the user's current field of view and in the opposite direction of the user's movement. In this regard, virtual pedestrians (or other dynamic virtual objects) can then quickly move or walk towards the target location. This behavior will typically produce virtual pedestrians (or other dynamic virtual objects) that move or walk along the outlines of ad-hoc physical objects. In other words, they can be moved within the virtual environment to move or walk along the outlines in the wall map with a small amount of randomness applied, to avoid the impression of a uniform march, by way of example.

Some ad-hoc physical objects in the real world can be insular, such as pillars or lanterns. In such cases, the runtime sub-system 1130 can animate a virtual pedestrian (or other dynamic virtual object) to walk to the respective virtual location and stop there. While in some embodiments, virtual pedestrians (or other dynamic virtual objects) in this case can idle upon reaching the respective virtual location, the runtime sub-system 1130 could add animations to the virtual pedestrians (or other dynamic virtual objects) at the respective virtual location. For instance, a virtual pedestrian could stop and tie shoelaces, play with their phone, or look up, among any other activities that would seem common or thematically consistent with the virtual environment.

In order to represent dynamic physical objects, the runtime sub-system 1130 can simply move virtual pedestrians (or other dynamic virtual objects) through the virtual environment. The movements of dynamic physical objects can be tracked by the real-time environment sensing sub-system (e.g., real-time environment sensing sub-system 1120 of FIG. 11), enabling the runtime sub-system 1130 to continuously update the associated virtual pedestrians (or other dynamic virtual objects) in the virtual world to match their detected corresponding positions and directions.

In some aspects, if virtual pedestrians (or other dynamic virtual objects) are no longer useful to represent physical objects, the runtime sub-system 1130 can remove or delete them from the virtual environment as soon as they are determined outside the user's field of view. Virtual pedestrians (or other dynamic virtual objects) that move towards the user to represent a physical object can simply vanish once the user has been determined to walk past them in the virtual environment. The virtual pedestrians (or other dynamic virtual objects) that walk into the same direction as the user can move away once the runtime sub-system 1130 determines they have reached the farthest tracked ad-hoc obstacle. In this regard, the runtime sub-system 1130 can remove them from the virtual environment.

As described in accordance with some embodiments, the runtime sub-system 1130 can guide the user in navigating to a real-world location that the user has selected or provided. In addition to keeping the user safe while walking, the runtime sub-system 1130 can further generate indicators or prompts that are provided for display and point into the direction the user needs to follow, similar to a real-world navigation system. As such, in accordance with some embodiments, the runtime sub-system 1130 can represent directions through a small arrow or other graphical indicator that is overlaid on the virtual environment (e.g., at the bottom of the user's field of view). In some aspects, the graphical indicator can keep navigation to a minimum, revealing just enough information for the user to maintain on track. In some other aspects, the graphical indicator can be employed in conjunction with redirected walking efforts. In some additional aspects, while the graphical indicator can point into a general direction, virtual pedestrians (or other dynamic virtual objects) can provide an even stronger cue of which path the user can actually walk.

Figure 13:
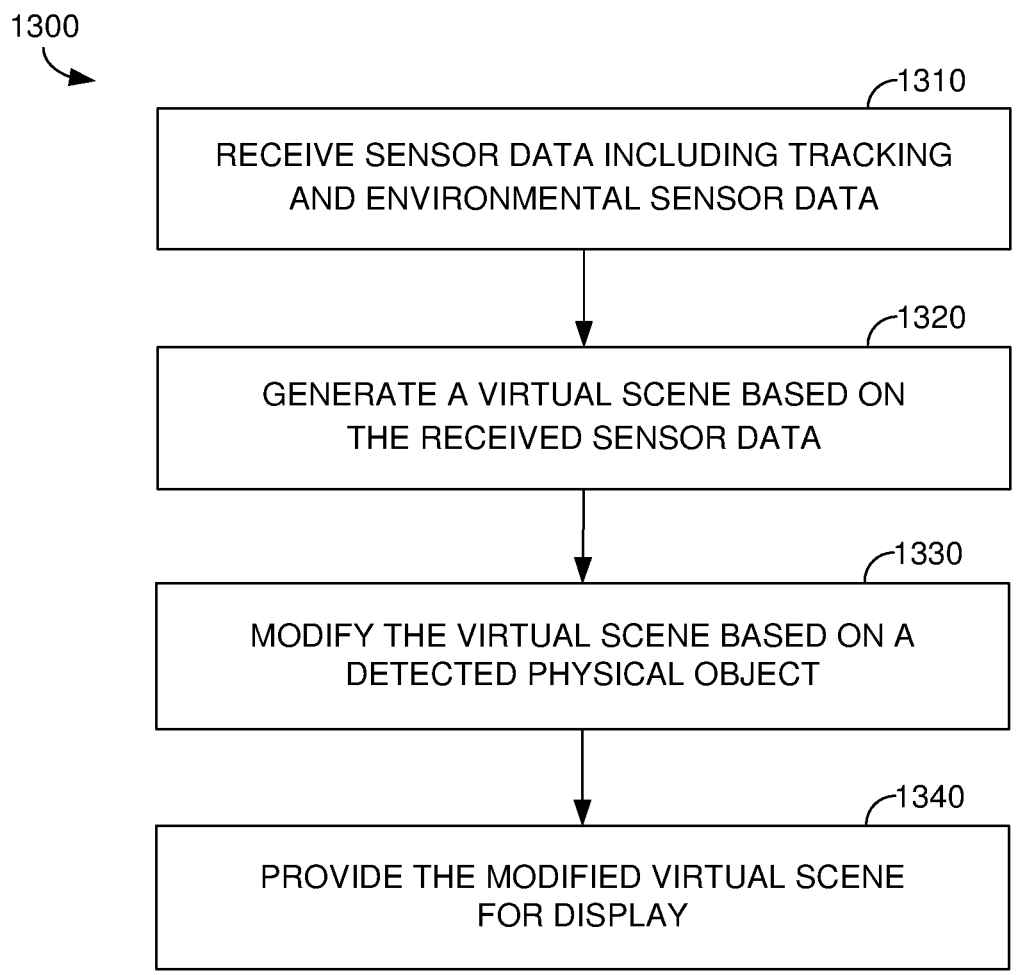
FIG. 13 is a flow diagram showing a method for dynamically rendering and updating a fully-immersive virtual environment in real-time based on received sensor data, in accordance with some embodiments of the present disclosure.

Having described various aspects of the present disclosure, exemplary methods are described below for dynamically rendering and updating a fully-immersive virtual environment in real-time based on received sensor data. Referring to FIG. 13, a flow diagram is provided depicting a method 1300 for dynamically rendering and updating a fully-immersive virtual environment in real-time. Each block of method 1300 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media.

In various embodiments, a head-mounted display (HMD) is coupled to a computing device, such as VR roam tracking device 615 of FIG. 6. In some embodiments, the HMD can be coupled to a set of tracking sensors, such as tracking sensors 620a of FIG. 6, and a set of environmental sensors, such as environmental sensors 620b of FIG. 6. In some further embodiments, the HMD can be further coupled to a set of location sensors, such as location sensors 630c of FIG. 6, among other things. In various embodiments, any one or more of the tracking sensors, environmental sensors, or location sensors can be rigidly fixed to the HMD. Initially, at block 1310, the computing device can receive a first set of sensor data from the set of tracking sensors and the set of environmental sensors. It is contemplated that a user is wearing the HMD, such that the HMD is secured to the user's head and that the user can view a graphical output generated for display by the computing device to the HMD.

At block 1320, the computing device can generate a virtual scene (e.g., at least a portion of a virtual environment) based on the received first set of sensor data. In some aspects, the virtual scene can be generated based further on a defined virtual theme. For instance, a virtual theme can include one of a plurality of defined virtual themes that can be selected based on a received input by the computing device. In another instance, the defined virtual theme can be associated with a level or world of a video game, by way of example. The virtual scene that is generated can be associated with the defined virtual theme, such that visible characteristics of the virtual scene is consistent with the virtual theme. By way of example, if a virtual theme is a fantasy world, the virtual scene may depict a grassy ground, trolls, fairies, boulders, and the like. In another example, if the virtual theme is a dungeon world, the virtual scene may depict a stone floor, knights, spikes rising from the floor, and the like.

In some embodiments, the first set of sensor data can include one or more pieces or frames of environmental sensor data, such as depth maps generated by the set of environmental sensors. In this regard, the computing device can receive each piece of environmental sensor data, and determine, among other things, a height and/or distance associated with the ground within a field of view or perspective of the set of environmental sensors, or a height and/or distance associated with other physical objects that are present within the field of view or perspective of the set of environmental sensors. In some embodiments, the computing device can determine that a physical object is present within the field of view or perspective based on a determined height of a physical object being greater than a determined height of the ground. In some aspects, a height of the ground is not necessarily determined, but is assumed to have a height of zero. In this regard, any physical object determined to have a height greater than zero can be detected, and a distance relative to the physical object can be determined, based on one or more received pieces of environmental sensor data.

The computing device can thus generate the virtual scene to include at least a portion of a virtual path (e.g., a graphical representation of a virtually traversable area) that corresponds to a determined physically navigable path (e.g., an obstruction-free area in the real world that is physically traversable). In some embodiments, the computing device can generate a set of virtual boundaries (e.g., virtual walls) within the virtual scene, depicting either a virtual room that is bounded at least in part by the virtual boundaries or a virtual corridor bounded at least in part by the virtual boundaries. In some embodiments, dimensions of a virtual room can be predefined. In some other embodiments, dimensions of the virtual room can be determined based on received environmental sensor data (e.g., for determining distances from HMD to surrounding walls). In some aspects, a virtual room or virtual corridor can be generated based on a determination that sufficient environmental sensor data has not been received to define such dimensions, or alternatively that sufficient environmental sensor data has been received to detect physical objects located beyond the dimensions (of a virtual room or corridor) corresponding to the physical environment. In other words, based on the environmental sensor data received, the computing device can either generate a virtual room or virtual corridor having virtual boundaries that correspond to detected dimensions of a physical room or physical corridor (or hallway) in the physical environment, or can alternatively generate a virtual room or virtual corridor having predefined virtual boundaries with predefined dimensions. In some embodiments, one or more of the virtual boundaries can present a virtual door that can be opened (based on a received input, for instance) to reveal another virtual room or corridor based on additional environmental sensor data received when the user is at a location in the physical environment that corresponds to the location of one of the virtual boundaries or virtual door.

In some further embodiments, at block 1330, the computing device can receive a second set of sensor data from the set of environmental sensors. It is contemplated that the second set of sensor data is received after the first set of sensor data. In some aspects, the second set of sensor data is received immediately subsequent to the first set of sensor data, though embodiments are not necessarily limited as such. Based on the received second set of sensor data, the computing device can detect that a physical object is present within the field of view of the set of environmental sensors. As noted above, the physical object can be detected based on a determined height thereof, among other things. As such, the computing device can generate a virtual obstruction to represent the detected physical object. In some embodiments, the generated virtual obstruction can be associated with the defined virtual theme, such that visible characteristics of the virtual obstruction is consistent with the virtual theme of the generated virtual environment. In various embodiments, the generated virtual obstruction is placed within the generated virtual environment in a position (e.g., location, distance) that corresponds to the determined position of the physical object.

In some further embodiments, the virtual obstruction can be selected from a plurality of virtual obstructions stored in a memory of the computing device. The virtual obstruction can be selected based on a variety of factors, such as the defined virtual theme, a determined distance or relative location of the physical object, a determined size of the physical object, a determined color of the physical object, detected visible features of the physical object, a detected movement or motion of the physical object, and the like. In some embodiments, a virtual rising mechanism (e.g., virtual spikes rising from or falling into floor, rock tiles rising from or sinking into lava) can be selected to maintain thematic consistency, maintain realism, and account for physical objects that are detected within a threshold distance and/or within a threshold amount of time, among other things.

At block 1340, the computing device can provide the modified virtual scene including the generated virtual obstruction for stereoscopic display to the HMD. The HMD can receive the modified virtual scene and display it, such that the user can experience the virtual environment. The modified virtual scene can represent both a determined navigable path in the physical world, in addition to one or more physical objects detected in the physical world. In this way, the user can traverse about a physical environment while remaining fully-immersed in a virtual environment without concerns of collisions with physical objects that cannot be seen while wearing the HMD.

Figure 14:
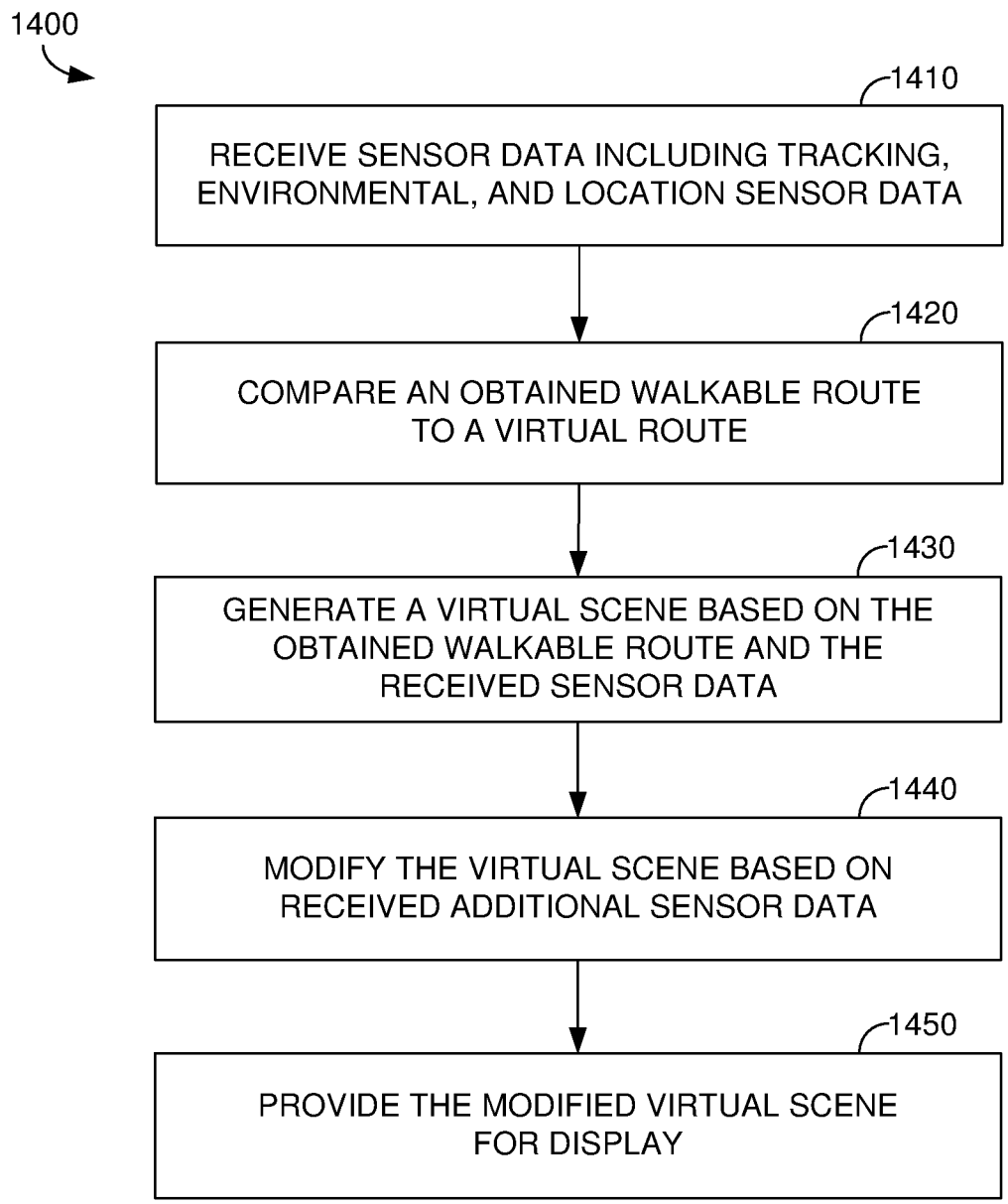
FIG. 14 is a flow diagram showing a method for dynamically rendering and updating a fully-immersive virtual environment in real-time based on received sensor data, in accordance with some embodiments of the present disclosure.

Referring to FIG. 14, a flow diagram is provided depicting a method 1400 for dynamically rendering and updating a fully-immersive virtual environment in real-time. Each block of method 1400 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media.

In various embodiments, a head-mounted display (HMD) is coupled to a computing device, such as VR roam tracking device 615 of FIG. 6. In some embodiments, the HMD can be coupled to a set of tracking sensors, such as tracking sensors 620a of FIG. 6, a set of environmental sensors, such as environmental sensors 620b of FIG. 6, and a set of location sensors, such as location sensors 630c of FIG. 6, among other things. In various embodiments, any one or more of the tracking sensors, environmental sensors, or location sensors can be rigidly fixed to the HMD.

Initially, at block 1410, the computing device can receive a first set of sensor data from the set of tracking sensors, the set of environmental sensors, and/or the set of location sensors. It is contemplated that a user is wearing the HMD, such that the HMD is secured to the user's head and that the user can view a graphical output generated for display by the computing device to the HMD. In some embodiments, the computing device can determine a physical location of the HMD based on sensor data received from the set of location sensors. The computing device can obtain an electronic map that corresponds to the determined physical location, whether retrieving the electronic map from a memory of the computing device or communicating the determined physical location to a third party server to retrieve therefrom the electronic map. In some further embodiments, the computing device can receive a selection from the user, corresponding to a target physical destination, based on a received input. The computing device can either determine a walkable route from the determined physical location to the selected target destination, or communicate the determined physical location and the target physical destination to the third party server to retrieve therefrom the walkable route.

At block 1420, the computing device can obtain the determined walkable route and compare it to a set of virtual routes associated with a virtual world stored in a memory of the computing device. The computing device can select one of the set of virtual routes that best corresponds to the determined walkable route based on the performed comparisons. In various embodiments, the computing device can map one or more segments of the selected virtual route to one or more corresponding segments of determined walkable route. In some further embodiments, the computing device can determine that certain segments of the selected virtual route may require adjustments to the virtual scene depicted to the user when a determination is made that the user is located within such segments. In this regard, the computing device can compensate for determined angular or distance-based differences between the selected virtual route and the determined walkable route.

The computing device can, at block 1430, generate a virtual scene (e.g., at least a portion of a virtual environment) based on the received first set of sensor data. In some aspects, the virtual scene can be generated based further on a defined virtual theme. For instance, a virtual theme can include one of a plurality of defined virtual themes that can be selected based on a received input by the computing device. In another instance, the defined virtual theme can be associated with a level or world of a video game, by way of example. The virtual scene that is generated can be associated with the defined virtual theme, such that visible characteristics of the virtual scene is consistent with the virtual theme.

In some embodiments, the computing device can determine the presence of static physical objects (e.g., buildings, streets) based on the determined walkable route and the retrieved electronic map. More specifically, the electronic map can depict static physical objects along the determined walkable route, such that the presence and location of a static physical object relative to the HMD can be determined by the computing device based on location data received from the set of location sensors at any given time. In this regard, the computing device can extract the locations and dimensions of the depicted static physical objects, determine a current physical location of the HMD, and modify the virtual scene to include static virtual objects that correspond to the determined static physical objects.

The computing device can thus generate the virtual scene to include at least a portion of a virtual path (e.g., a graphical representation of a virtually traversable area) that corresponds to a determined physically navigable path (e.g., an obstruction-free area in the real world that is physically traversable). The computing device can further generate virtual objects that represent the determined static virtual objects within the virtual scene.

In some further embodiments, at block 1440, the computing device can receive a second set of sensor data from the set of environmental sensors. In some further embodiments, the second set of sensor data can include one or more pieces or frames of environmental sensor data, such as depth maps generated by the set of environmental sensors. In this regard, the computing device can receive each piece of environmental sensor data, and determine, among other things, a height and/or distance associated with the ground within a field of view or perspective of the set of environmental sensors, or a height and/or distance associated with other physical objects that are present within the field of view or perspective of the set of environmental sensors. In some embodiments, the computing device can determine that a physical object (e.g., an ad-hoc physical object) is present within the field of view or perspective based on a determined height of a physical object being greater than a determined height of the ground. In some aspects, a height of the ground is not necessarily determined, but is assumed to have a height of zero. In this regard, any physical object (e.g., ad-hoc physical object) determined to have a height greater than zero can be detected, and a distance relative to the physical object can be determined, based on one or more received pieces of environmental sensor data.

Based on the received second set of sensor data, the computing device can detect that a physical object is present within the field of view of the set of environmental sensors. As noted above, the physical object can be detected based on a determined height thereof, among other things. As such, the computing device can generate, in addition to the static virtual objects, a virtual obstruction to represent the detected physical object (e.g., ad-hoc physical object). In some embodiments, the generated virtual obstruction (or any virtual object) can be associated with the defined virtual theme, such that visible characteristics of the virtual obstruction (or virtual object) is consistent with the virtual theme of the generated virtual environment. In various embodiments, the generated virtual obstruction is placed within the generated virtual environment in a position (e.g., location, distance) that corresponds to the determined position of the detected physical object.

In some further embodiments, a virtual object or obstruction can be selected from a plurality of virtual obstructions stored in a memory of the computing device. The virtual obstruction can be selected based on a variety of factors, such as the defined virtual theme, a determined distance or relative location of the physical object, a determined size of the physical object, a determined color of the physical object, detected visible features of the physical object, a detected movement or motion of the physical object, and the like. In some embodiments, a virtual rising mechanism (e.g., virtual spikes rising from or falling into floor, rock tiles rising from or sinking into lava) can be selected to maintain thematic consistency, maintain realism, and account for physical objects that are detected within a threshold distance and/or within a threshold amount of time, among other things. In some other embodiments, an animated or moving virtual object (e.g., a pedestrian, an animal, a vehicle) can be selected to represent determined moving physical objects or account for a more dynamic nature of the physical environment (e.g., an outdoor environment).

At block 1450, the computing device can provide the modified virtual scene including the generated static virtual objects and/or ad-hoc virtual obstructions for stereoscopic display to the HMD. The HMD can receive the modified virtual scene and display it, such that the user can experience the virtual environment. The modified virtual scene can represent both a determined navigable path in the physical world, in addition to one or more physical objects detected in the physical world. In this way, the user can traverse about a physical environment while remaining fully-immersed in a virtual environment without concerns of collisions with physical objects that cannot be seen while wearing the HMD.

Figure 15:
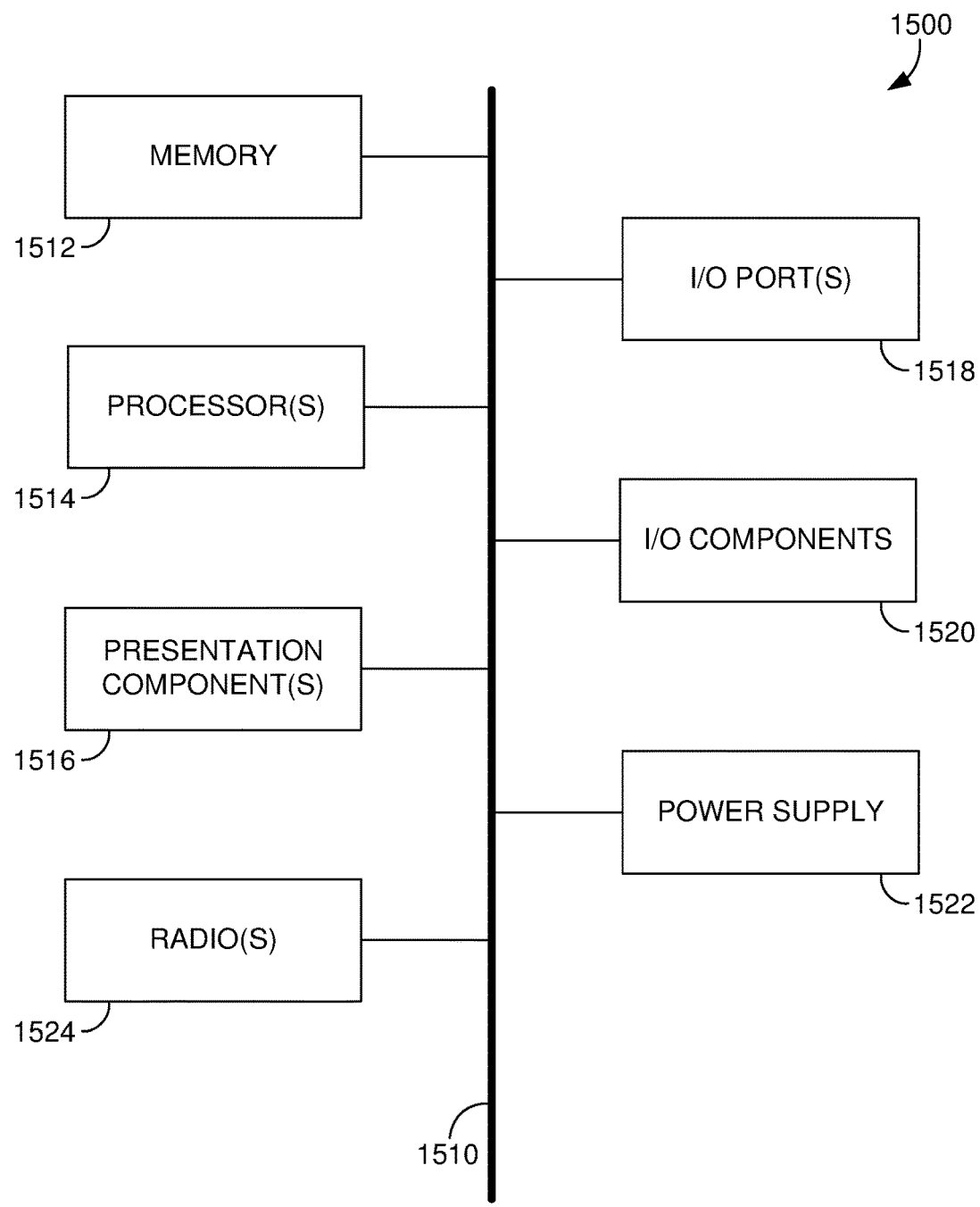
FIG. 15 is a block diagram of an exemplary computing environment suitable for use in accordance with some embodiments of the present disclosure.

With reference now to FIG. 15, computing device 1500 includes a bus 1510 that directly or indirectly couples the following devices: memory 1512, one or more processors 1514, one or more presentation components 1516, input/output ports 1518, input/output components 1520, and an illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 15 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments of the present invention are described with reference to a head-mounted display unit comprising or coupled to a virtualizing computing device; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for dynamically updating a fully-immersive virtual environment based on a physical environment, the method comprising:
   receiving, by a computing device, a first set of sensor data from a set of tracking sensors and a set of environmental sensors coupled to a head-mounted display (HMD);
   providing for display, by the computing device, a virtual scene that is generated based on the received first set sensor data a defined virtual theme, and an electronic topography map, the virtual scene being associated with the defined virtual theme and including at least a portion of a virtual path that corresponds to at least a portion of a navigable path determined based on the received first set of sensor data and the electronic topography map; and
   modifying, by the computing device, the displayed virtual scene-in response to a detected physical object appearing within the determined navigable path, the physical object being detected appearing based on a second set of sensor data received from the set of environmental sensors while the virtual scene is being displayed, wherein the virtual scene is modified to include a virtual obstruction associated with the defined virtual theme and corresponding to the physical object detected within the determined navigable path.

2. The method of claim 1, further comprising:
   detecting, by the computing device, a movement of the detected physical object relative to the HMD based at least in part on the received second set of sensor data; and
   adjusting, by the computing device, a position of the virtual obstruction within the virtual scene based on the detected movement.

3. The method of claim 1, wherein the navigable path is determined based further on a walkable route, the walkable route being determined based on a third set of sensor data received from a set of location sensors coupled to the HMD and the electronic topography map.

4. The method of claim 1, wherein the virtual scene is modified based further on a third set of sensor data received from a set of location sensors coupled to the HMD, a selected target destination, and the electronic topography map.

5. The method of claim 4, further comprising:
   determining, by the computing device, the navigable path based further on the received third set of sensor data, the electronic topography map, and the selected target location; and
   comparing, by the computing device, the virtual path and the determined navigable path, wherein the virtual path is one of a set of virtual paths defined in a stored virtual world,
   wherein the virtual scene is modified based further on the comparison of the virtual path and the determined navigable path.

6. The method of claim 4, further comprising:
   determining, by the computing device, a location of a static physical object based on the received third set of sensor data and the electronic topography map; and
   modifying, by the computing device, the virtual scene based further on the determined location of the static physical object, wherein the virtual scene is modified to include another virtual obstruction associated with the defined virtual theme and corresponding to the static physical object.

7. The method of claim 6, wherein the location of the static physical object is determined based on a portion of the electronic topography map corresponding to the received third set of sensor data, wherein the third set of sensor data includes GPS coordinates.

8. The method of claim 1, wherein at least a portion of the received first set of sensor data corresponds to a first height associated with the determined navigable path, and the physical object is detected based on a determination that at least a portion of the received second set of sensor data corresponds to a second height greater than the first height.

9. The method of claim 1, wherein the set of tracking sensors includes a rotational tracking sensor and a position tracking sensor, and the set of environmental sensors includes a depth map sensor.

10. A non-transitory computer storage medium storing computer-useable instructions that, when used by one or more computing devices, cause the one or more computing devices to perform operations comprising:
   receiving a first set of sensor data associated with a HMD, the first set of sensor data including tracking sensor data and environmental sensor data;
   providing for display a virtual scene that is generated based on the received first set sensor data and an electronic topography map, the virtual scene having a virtual theme and including at least a portion of a virtual path corresponding to at least a portion of a navigable path determined based on the received first set of sensor data and the electronic topography map;
   modifying the displayed virtual scene in response to a physical object appearing within the determined navigable path, the physical object being detected appearing based on a received second set of sensor data including additional environmental sensor data, wherein the virtual scene is modified to include a virtual obstruction associated with the virtual theme and corresponding to the detected physical object; and
   providing the modified virtual scene for display to the HMD based at least in part on the received first and second sets of sensor data.

11. The medium of claim 10, the operations further comprising:

selecting the virtual obstruction from a stored plurality of virtual objects based on any one of a determined relative distance, relative position, or movement of the detected physical object, wherein the relative distance, relative position, or movement is determined based at least in part on the received second set of sensor data.

12. The medium of claim 10, the operations further comprising:
   detecting a movement of the detected physical object relative to the HMD based at least in part on the received second set of sensor data; and
   adjusting, within the modified virtual scene, a position of the virtual obstruction to correspond with the detected movement.

13. The medium of claim 10, wherein the virtual scene is generated to include a set of virtual boundaries based on a set of predefined dimensions, wherein at least one virtual boundary of the set of virtual boundaries presents a virtual door.

14. The medium of claim 13, the operations further comprising:
   opening the virtual door to reveal another virtual scene based at least in part on a third set of sensor data including further environmental sensor data received at a physical location corresponding to the virtual door.

15. The medium of claim 10, wherein the virtual obstruction includes a rising mechanism.

16. A computerized system comprising:
   at least one processor, and
   at least one storage medium storing computer-useable instructions that, when used by the at least one processor, causes the at least one computing device to perform operations comprising:
   determining at least one of an orientation or a position of a head-mounted display (HMD) based on received tracking sensor data;
   determining:
      a physical environment and a navigable path therein based at least in part on an electronic topography map,
      a presence of physical obstruction appearing in the navigable path after the navigable path is determined,
      a distance between the HMD and the determined present physical obstruction, and
      a position of the HMD relative to the determined present physical obstruction,
      wherein the presence, the distance, and the position are each determined based on received environmental sensor data; and
   modifying a virtual scene that was generated based on the determined physical environment and navigable path, the virtual scene being modified in response to the determined present physical obstruction, the determined position, and the determined distance.

17. The system of claim 16, the operations further comprising:
   inserting a virtual object into the generated virtual scene as a virtual representation of the determined present physical obstruction.

18. The system of claim 17, the operations further comprising:
   selecting the virtual object from a stored set of virtual objects based on a determined movement of the determined present physical obstruction, the movement being determined based at least in part on the received environment sensor data.

19. The system of claim 18, the operations further comprising:
   repositioning the generated virtual object within the generated virtual scene based on the determined movement of the determined present physical obstruction.

20. The system of claim 16, the operations further comprising:
   modifying the generated virtual scene with a virtual boundary based at least in part on the received environment sensor data, wherein the virtual boundary is determined based on predefined dimensions.

* * * * *